(12) United States Patent
Tian

(10) Patent No.: US 11,487,736 B2
(45) Date of Patent: Nov. 1, 2022

(54) BLOCKCHAIN TRANSACTION PROCESSING SYSTEMS AND METHODS

(71) Applicant: ALIPAY (HANGZHOU) INFORMATION TECHNOLOGY CO., LTD., Zhejiang (CN)

(72) Inventor: Shikun Tian, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/353,399

(22) Filed: Jun. 21, 2021

(65) Prior Publication Data

US 2021/0311925 A1 Oct. 7, 2021

Related U.S. Application Data

(63) Continuation of application No. PCT/CN2020/118377, filed on Sep. 28, 2020.

(51) Int. Cl.
*G06F 16/23* (2019.01)
*G06F 13/20* (2006.01)
*G06F 9/46* (2006.01)
*G06K 9/00* (2022.01)

(52) U.S. Cl.
CPC .......... *G06F 16/2315* (2019.01); *G06F 9/466* (2013.01); *G06F 13/20* (2013.01)

(58) Field of Classification Search
None
See application file for complete search history.

(56) References Cited

U.S. PATENT DOCUMENTS

| 8,209,702 B1 | 6/2012 | Roytman et al. |
| 2016/0246643 A1 | 8/2016 | Xu et al. |
| 2020/0026548 A1 | 1/2020 | Huang |

(Continued)

FOREIGN PATENT DOCUMENTS

| CN | 109636592 | 4/2019 |
| CN | 111625593 | 9/2020 |
| EP | 3566391 | 11/2019 |

(Continued)

OTHER PUBLICATIONS

Andersen et al. Enabling synergy in IoT: Platform to service and beyond. Oct. 2016. Journal of Network and Computer Applications. pp. 96-110.*

(Continued)

*Primary Examiner* — Tuankhanh D Phan
(74) *Attorney, Agent, or Firm* — Fish & Richardson P.C.

(57) ABSTRACT

Disclosed are computer-implemented methods, non-transitory computer-readable media, and systems or processing blockchain transactions. One computer-implemented method includes receiving a number of blockchain transactions to be executed by a blockchain node. The blockchain node allocates one or more threads and one or more coroutines for processing the number of blockchain transactions based on whether the number of blockchain transactions are CPU-bound or I/O-bound. The blockchain node executes the number of blockchain transactions using the one or more threads and one or more coroutines, generates a blockchain block including the number of blockchain transactions, and adds the blockchain block to the blockchain.

21 Claims, 8 Drawing Sheets

(56) References Cited

U.S. PATENT DOCUMENTS

2020/0177373 A1* 6/2020 Komandur ............ H04L 9/3247
2020/0394162 A1* 12/2020 Iizuka .................. H04L 9/3239

FOREIGN PATENT DOCUMENTS

| WO | WO 2019116184 | 6/2019 |
| WO | WO 2019120332 | 6/2019 |
| WO | WO 2020035095 | 2/2020 |

OTHER PUBLICATIONS

Englund et al. A Web Crawler to Effectively Find Web Shops Built with a Specific E-Commerce Plug-in. Jun. 29, 2017.*
Argobots: A lightweight Low-Level Threading and Tasking Framework IEEE Transactions on Parallel and Distributed Systems, vol. 29, Mar. 2018. pp. 512-526.*
U.S. Appl. No. 17/353,274, Tian, filed Jun. 21, 2021.
U.S. Appl. No. 17/359,459, Tian, filed Jun. 25, 2021.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org. 2005, 9 pages.
PCT International Search Report and Written Opinion in International Application No. PCT/CN2020/118377, dated Jun. 25, 2021, 9 pages.
U.S. Appl. No. 17/353,274, filed Jun. 21, 2021, Tian.
U.s. Appl. No. 17/359,459, filed Jun. 25, 2021, Tian.
EP Extended Search Report in European Application No. 20897646.4, dated Dec. 3, 2021, 12 pages.

* cited by examiner

BLOCKCHAIN TRANSACTION PROCESSING SYSTEMS AND METHODS

CROSS-REFERENCE TO RELATED APPLICATIONS

This application is a continuation of PCT Application No. PCT/CN2020/118377, filed on Sep. 28, 2020, which is hereby incorporated by reference in its entirety.

TECHNICAL FIELD

This specification relates to processing blockchain transactions.

BACKGROUND

With the rapid development of the blockchain technologies, applications or service scenarios of blockchain technologies have been expanding, for example, in judicial certification, traceability, invoices, supply chain finance, etc. The volume of data generated by various blockchain services has also grown rapidly. Processing and storage of large-scale blockchain data (e.g., data generated for large-scale accounts, a large amount of state data for a single account, and a large amount of block data for a single blockchain) require a large number of computer resources such as computational/computing, storage, and network resources. Moreover, the growth of the data scale, especially after the blockchain systems have been operated for a long time, further increase the demands for the computational resources.

As such, more efficient ways of handling blockchain data and processing blockchain transactions are desirable for meeting the increasing demands from various blockchain applications.

SUMMARY

Described embodiments of the subject matter can include one or more features, alone or in combination.

For example, in one embodiment, a method for processing blockchain transactions includes receiving a plurality of blockchain transactions to be executed by a blockchain node. The blockchain node determines whether the plurality of blockchain transactions are CPU-bound or I/O-bound. The blockchain node further allocates one or more threads for processing the plurality of blockchain transactions in parallel and one or more coroutines for processing the number of blockchain transactions asynchronously, based on whether the plurality of blockchain transactions are CPU-bound or I/O-bound. The blockchain node executes the plurality of blockchain transactions using the allocated one or more threads and one or more coroutines, generates a blockchain block including the plurality of blockchain transactions, and adds the blockchain block to a blockchain.

In some embodiments, these general and specific aspects may be implemented using a system, a method, or a computer program, or any combination of systems, methods, and computer programs. The foregoing and other described embodiments can each, optionally, include one or more of the following aspects.

In some embodiments, allocating one or more threads of the blockchain node and one or more coroutines of the blockchain node for processing the plurality of blockchain transactions includes: determining a first number of threads for processing the plurality of blockchain transactions in parallel in response to determining that the plurality of blockchain transactions are I/O-bound; or determining a second number of threads for processing the plurality of blockchain transactions in parallel in response to determining that the plurality of blockchain transactions are CPU-bound, wherein the first number of threads are equal to or less than the second number of threads, and wherein the first number of threads is preconfigured before receiving the plurality of blockchain transactions.

In some embodiments, allocating one or more threads of the blockchain node and one or more coroutines of the blockchain node for processing the plurality of blockchain transactions includes: determining a third number of coroutines for processing the plurality of blockchain transactions asynchronously in response to determining that the plurality of blockchain transactions are I/O-bound; or determining a fourth number of coroutines for processing the plurality of blockchain transactions asynchronously in response to determining that the plurality of blockchain transactions are CPU-bound, wherein the fourth number of coroutines are less than the third number of coroutines.

In some embodiment, determining the plurality of blockchain transactions are CPU-bound or I/O-bound includes: determining the plurality of blockchain transactions are CPU-bound or I/O-bound based on a transaction type of at least one of the plurality of blockchain transactions.

In some embodiments, the transaction type includes an asset transfer transaction, an account inquiry transaction, a verification and commit transaction, a certificate storage transaction, a native smart contract transaction, an encryption transaction, a TEE (Trusted Execution Environment) transaction, a WASM (WebAssembly) transaction, or an EVM (Ethereum Virtual Machine) transaction.

In some embodiments, determining the plurality of blockchain transactions are CPU-bound or I/O-bound based on the transaction type of at least one of the plurality of blockchain transactions includes: determining whether the at least one of the plurality of blockchain transactions is CPU-bound or I/O-bound based on a statistical computational resource utilization record of previous blockchain transactions of the transaction type.

In some embodiments, determining the plurality of blockchain transactions are CPU-bound or I/O-bound based on a transaction type of one of the plurality of blockchain transactions includes: determining, by the blockchain node, the plurality of blockchain transactions are I/O-bound in response to determining that a total number of I/O-bound transactions in the plurality of blockchain transactions exceeds a first threshold.

In some embodiments, determining, by the blockchain node, the plurality of blockchain transactions are CPU-bound or I/O-bound based on a transaction type of one of the plurality of blockchain transactions includes: determining, by the blockchain node, the plurality of blockchain transactions are CPU-bound in response to determining that a total number of CPU-bound transactions in the plurality of blockchain transactions exceeds a second threshold.

In some embodiments, the blockchain node includes a total number of threads, a subset of the total number of threads is dedicated to the storage system, and the first number of threads are not from the subset of the total number of threads.

In some embodiments, the method further includes: obtaining utilization data of computational resources of the blockchain node for the executing the plurality of blockchain transactions; analyzing the utilization data; and updating a criterion for determining whether a next plurality of blockchain transactions are CPU-bound or I/O-bound based on the analyzing.

In some embodiments, updating the criterion for determining whether a next plurality of blockchain transactions are CPU-bound or I/O-bound includes one or more of: designating a new type of blockchain transaction as CPU-bound or I/O-bound; changing a classification of an existing type of blockchain transactions from CPU-bound to I/O-bound or from I/O-bound to CPU-bound; or updating a threshold of determining the next plurality of blockchain transactions are CPU-bound or I/O-bound.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
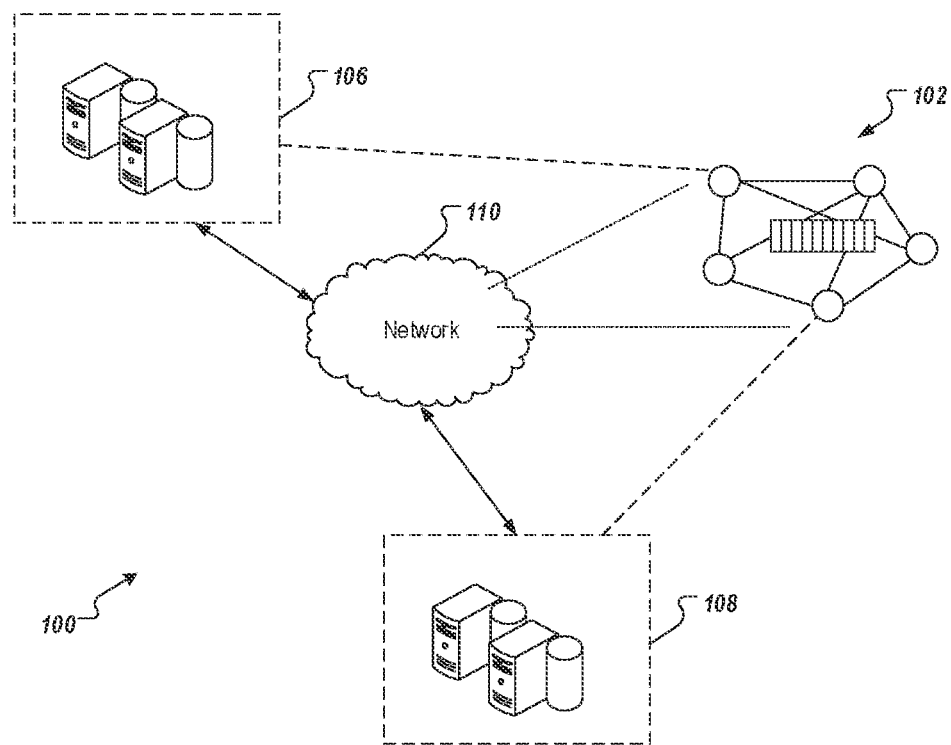
FIG. 1 is a diagram illustrating an example of an environment that can be used to execute embodiments of this specification.

This specification describes technologies for processing blockchain transactions. A blockchain transaction (also simply referred to as a transaction) can include data, instructions, or operations to be executed by a blockchain node in a blockchain network. The blockchain transaction can be generated, for example, by a client device or a participating system of the blockchain network. A blockchain node can receive the blockchain transaction, perform consensus processing on the blockchain transaction, and, after the consensus is reached, publish the blockchain transaction by saving the blockchain transaction into a block of a blockchain for persistent storage. Processing blockchain transactions can require a significant amount of computational resources including computing resources (e.g., central processing unit (CPU) resources) and input/output (I/O) resources (e.g., storage and network resources), especially as the scale of a blockchain system increases, the operation time of the blockchain system extends, and/or the length of the blockchain maintained in the blockchain system grows. The techniques described in this specification can improve the processing efficiency of multiple blockchain transactions in multiple dimensions, for example, by leveraging both parallel and concurrent processing of the multiple blockchain transactions. For example, each one of multiple blockchain transactions or each subset of the multiple blockchain transactions can be distributed to be executed in parallel by a respective one of multiple threads, achieving parallel processing of the multiple blockchain transactions. As another example, a blockchain transaction or an operation of the blockchain transaction may be executed before receiving an execution result of a prior blockchain transaction or a prior operation of the blockchain transaction, achieving asynchronous or concurrent processing without compromising or otherwise changing execution results of the blockchain transactions and/or operations of the blockchain transaction.

The techniques described in this specification produce several technical effects. In some embodiments, the described techniques can improve the processing efficiency of multiple blockchain transactions (e.g., as measured by transactions per second (TPS)) significantly without increasing the available computing resources, by properly configuring the blockchain system and strategically scheduling the multiple blockchain transactions to enable both parallel and concurrent processing of the multiple blockchain transactions. In the processing of blockchain transactions, although the blockchain blocks are generated synchronously or in series, some blockchain transactions and/or some I/O operations of one or more blockchain transactions may be processed or executed asynchronously and/or in parallel, for example, depending on whether a conflict exists between or among the blockchain transactions and/or the I/O operations of the blockchain transactions. In some embodiments, the described techniques can use multiple threads to process the blockchain transactions in parallel, and use coroutines to process the blockchain transactions concurrently or asynchronously, improving the utilization of computing resources and storage resources.

In some embodiments, the described techniques can improve computer technologies by making more effective use of computational resources of a computer system for processing blockchain transactions. In some embodiments, the blockchain transactions can be categorized as CPU-bound blockchain transactions or I/O-bound blockchain transactions, for example, based on the applications or use cases of the blockchain transactions, and/or operations included in the blockchain transactions. A CPU-bound blockchain transaction can generally refer to a blockchain transaction that is bottlenecked by the CPU (e.g., a time to complete the blockchain transaction is determined principally by the speed/capability of the CPU, or the CPU is the primary limiting factor of the time for completing the blockchain transaction. A CPU-bound blockchain transaction can mainly include CPU-bound or CPU-extensive operations that primarily involve operations of the CPU. On the other hand, an I/O-bound blockchain transaction can generally refer to a blockchain transaction that is bottlenecked by I/O (e.g., a time to complete the blockchain transaction is determined principally by the time spent waiting for I/O operations to be completed; or the I/O is the primary limiting factor of the time for completing the blockchain transaction.) An I/O-bound blockchain transaction can include one or more I/O operations (e.g., reading or writing to disk, network, etc.). For example, a blockchain transaction of a large-scale blockchain account usually requires a large number of random disk access operations, which are I/O intensive and thus can be considered as an I/O-bound transaction. Comparing with existing transaction processing schemes, the disclosed asynchronous scheme can better exploit the disk I/O processing ability (e.g., as measured by input/output operations per second (IOPS)) and improve TPS of the blockchain transactions. In some embodiments, the described techniques can schedule the blockchain transactions based on the types of the blockchain transactions to make more efficient use of the CPU resources and the I/O resources of a computer system and improve the execution efficiency of the blockchain transactions. In some embodiments, the described techniques can realize an A×B computing architecture to improve the processing efficiency on two dimensions. Here A is the number of threads for parallel processing to address the scale of CPU-bound blockchain operations, and B is the number of concurrent I/O operations executable by each thread to address the scale of I/O-bound operations. As such, the processing efficiency of the blockchain transactions can be improved by a factor of A×B in some instances.

In some embodiments, the described techniques can distribute a number of blockchain transactions among multiple threads in a first thread pool such that each of the threads is scheduled to process a subset of the blockchain transactions. As such, different subsets of the blockchain transactions can be processed using their respective threads in parallel, improving the efficiency of processing the blockchain transactions.

Furthermore, for the blockchain transactions that are scheduled on the same thread, one or more coroutines can be employed for each one of the blockchain transactions. The blockchain transactions can then be processed by executing the coroutines asynchronously or concurrently. Asynchronous or concurrent execution of an operation and a prior operation can refer to, for example, starting execution of the operation before receiving an execution result of the prior operation. In some embodiments, asynchronous or concurrent execution of two or more operations can be achieved by using coroutines and performing a coroutine switch. In some embodiments, a coroutine can be a script, logic, code, or any other computer-readable program that includes one or more operations. Operations inside a coroutine are executed synchronously or sequentially. Multiple coroutines can be executed asynchronously or in a different order than the order written in the computer-readable programs (e.g., scripts, logics, codes), reducing idle time of computing resources and improving overall throughput of the system. In some embodiments, a coroutine has its own stack, local variables, and instruction pointer, but shares global variables with other coroutines. In some embodiments, coroutines can be used for non-preemptive multitasking, allowing execution to be suspended and resumed and achieving asynchronous concurrency of processing of blockchain transactions and/or operations. Computer-readable programs for existing blockchain-based systems are written with a synchronous logic, and operations or functions written in the computer-readable programs are executed synchronously. By using coroutines in executing blockchain transactions, the described techniques do not require a revolutionary or substantive change of the programming logic of the computer-readable programs while still achieving asynchronous concurrency of processing the blockchain transactions. In some embodiments, programmers (e.g., developers, clients, or administrative users of the blockchain system) can still write the computer-readable programs for blockchain transactions with a synchronous logic, while the described systems can generate coroutines based on the computer-readable programs, and realize asynchronous processing of the blockchain transactions. This can reduce the complexity and efforts in developing and implementing the blockchain-based system for asynchronous processing of blockchain transactions, and provide backward compatibility.

As an example of asynchronous or concurrent execution of two blockchain transactions, when the prior blockchain transaction has been executed to a point where the prior blockchain transaction becomes I/O-bound, waiting for data retrieval from the blockchain storage system, instead of letting the computing resources idle, the described techniques can use the computing resources to process a subsequent blockchain transaction. This can reduce idle time of the computing resources, improve the usage of the computing resources, and decrease the total processing time of all blockchain transactions that have been received, and reduce a block generation latency for generating a new block including all executed blockchain transactions in the blockchain system. Thus, the efficiency of the computer and performance of the overall blockchain system can be improved.

In some embodiments, the described techniques can configure a blockchain storage system with a separate second thread pool to handle I/O operations in the blockchain transactions. In some embodiments, the second thread pool is dedicated to I/O operations that interface with I/O devices in the blockchain storage system and read/write blockchain data in the blockchain storage system. For example, for multiple I/O operations of the blockchain transactions, the I/O operations can be scheduled to be performed by different threads in the second thread pool such that the I/O operations can be processed in parallel. In some embodiments, the described techniques can greatly increase the number of I/O operations per second (IOPS) and make more efficient use of the I/O resources, especially for I/O-bound blockchain transactions.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a hash of the previous block. Each block also includes a local timestamp (e.g., provided by a computing device that generates the block or a computing system that manages the blockchain), its own hash, and one or more transactions. For example, the block can include a block header and a block body. The block header can include the local timestamp, its own hash, and a hash of the previous block. The block body can include payload information such as the one or more transactions (or transaction data). The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

In some embodiments, a centralized ledger system can also adopt the data structure of a blockchain to leverage immutability, reliability, and trustworthiness of data stored on a blockchain. In some embodiments, such a centralized ledger system can be referred to as a blockchain-based centralized ledger system or a universal auditable ledger service system. In some embodiments, the blockchain-based centralized ledger system can include a central trusted authority that provides transparent, immutable, and cryptographically verifiable data that are stored in blocks of a blockchain data structure. The stored data can be in a log format, including, for example, not only for transaction logs but also other transaction data and block data. Due to the existence of the central trusted authority, the blockchain-based centralized ledger system does not need to perform consensus processes to establish trust. In some embodiments, the blockchain-based centralized ledger system can be more efficient compared to a typical blockchain-based distributed or decentralized ledger system. In some embodiments, the blockchain-based centralized ledger system can provide a cloud-based storage service with enhanced trust, efficiency, and storage performance.

In some embodiments, the centralized ledger system can be a node of a blockchain network. For example, the centralized ledger system can be a non-consensus node in the blockchain network and can provide highly reliable and high-performance auditable streaming ledger services for the consensus nodes or other non-consensus nodes in the blockchain network, or entities outside of the blockchain network.

In some embodiments, the distributed ledger system (DLS) and the blockchain-based centralized ledger system can be collectively referred to as a blockchain-based system. In other words, a blockchain-based system is used to refer to and is broad enough to encompass a distributed ledger system (DLS), a blockchain-based centralized ledger system, or another system that adopts the data structure of a blockchain to leverage immutability, reliability, and trustworthiness of data stored on a blockchain.

FIG. 1 is a diagram illustrating an example of an environment 100 that can be used to execute embodiments of this specification. In some examples, the environment 100 enables entities to participate in a consortium blockchain network 102. The environment 100 includes computing systems 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general, the network 110 represents one or more communication networks. In some cases, the computing systems 106, 108 can be nodes of a cloud computing system (not shown), or each of the computing systems 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Examples of computing systems include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
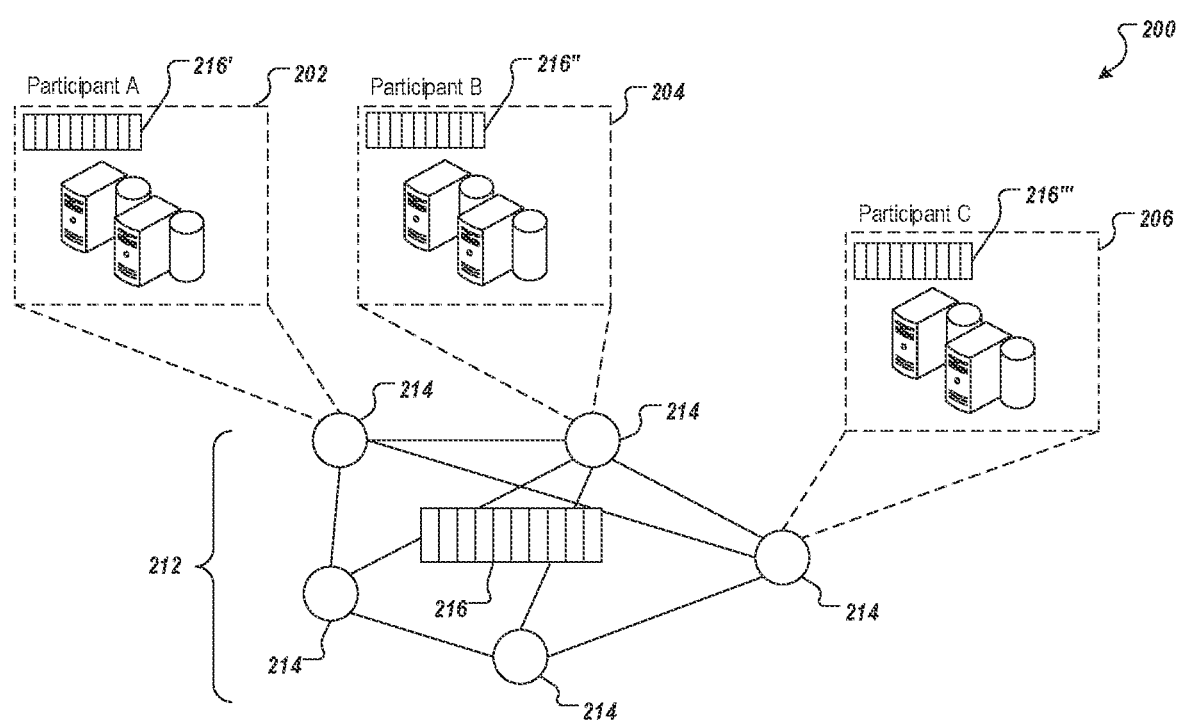
FIG. 2 is a diagram illustrating an example of an architecture in accordance with embodiments of this specification.

FIG. 2 is a diagram illustrating an example of an architecture 200 in accordance with embodiments of the specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including multiple nodes 214, at least some of which immutably record information in a blockchain 216. Although a single blockchain 216 is schematically depicted within the blockchain network 212, multiple copies of the blockchain 216 are provided and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, and 206 store respective, complete copies 216', 216", and 216''' of the blockchain 216.

A blockchain (e.g., the blockchain 216 of FIG. 2) is made up of a chain of blocks, each block storing data. Examples of data include transaction data representative of a transaction between two or more participants. Transaction data is used as an example of a data record stored in the blockchain. Examples of a transaction can include, without limitation, exchanges of something of value (e.g., assets, products, services, currency). In some embodiments, one or more operations executed in the ledger system can be stored as transaction data in the blockchain. For example, the transaction data can include one or more operations or manipulations of data stored in the block chain, information (e.g., timestamp information) obtained from an external resource, or any appropriate data can be stored in a blockchain (e.g., documents, images, videos, audio). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided and are themselves hashed to provide another hash. This process is repeated until, for all transactions to be stored in a block, a single hash value is provided. This hash value is referred to as a Merkle root hash and is stored in a header of the block. A change in any of the transactions will result in a change in its hash value, and ultimately, a change in the Merkle root hash.

Blocks are added to the blockchain through a consensus protocol. Multiple nodes within the blockchain network participate in the consensus protocol and perform work to have a block added to the blockchain. Such nodes are referred to as consensus nodes. PBFT, introduced above, is used as a non-limiting example of a consensus protocol. The consensus nodes execute the consensus protocol to add transactions to the blockchain and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted or rejected.

In some blockchain networks, cryptography is implemented to maintain the privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses key pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with the digital signature to Participant B. Participant B decrypts the digital signature using the public key of Participant A, and extracts the hash. Participant B hashes the message and compares the hashes. If the hashes are the same, Participant B can confirm that the message was indeed from Participant A, and was not tampered with.

Figure 3:
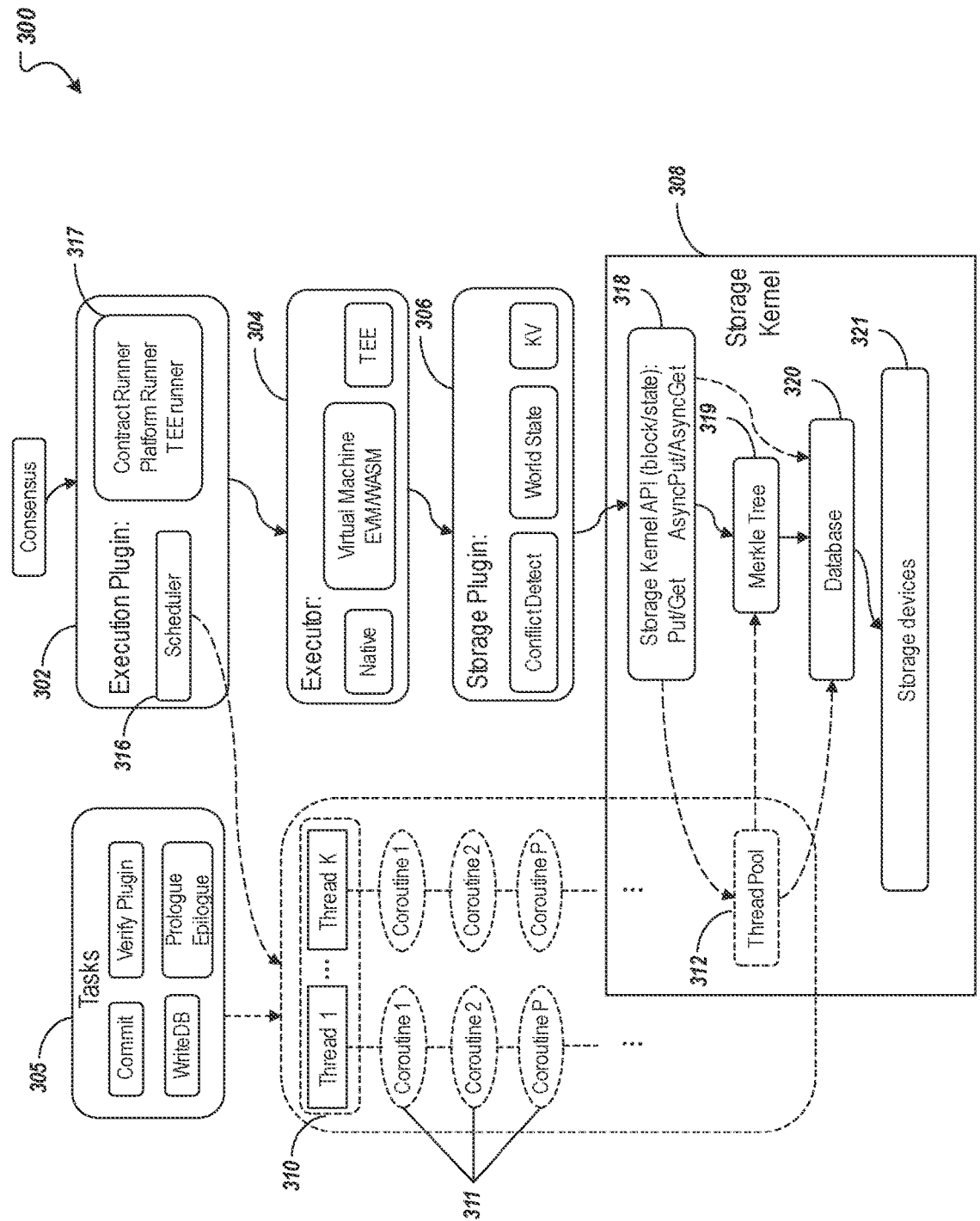
FIG. 3 is a diagram illustrating an example of a system for processing blockchain transactions in accordance with embodiments of this specification.

FIG. 3 is a diagram illustrating an example of a blockchain system 300 in accordance with embodiments of this specification. In some embodiments, the blockchain system 300 can be implemented on a network node (e.g., node 214 of FIG. 2) of a blockchain network (e.g., blockchain network 102 of FIG. 1 or 212 of FIG. 2) for processing blockchain transactions. For example, the blockchain system 300 can be implemented on each participant of a blockchain network (e.g., participant system 202, 204, or 206 of FIG. 2). In some embodiments, the blockchain system 300 can be configured to process multiple blockchain transactions in parallel and/or asynchronously to achieve processing concurrency.

As shown, the blockchain system 300 includes an execution plugin 302, an executor 304, a storage plugin 306, a storage kernel 308, a first thread pool 310, and a second thread pool 312. The execution plugin 302 includes a scheduler 316 and smart contract/platform/TEE runners 317. In some embodiments, the scheduler 316 is configured to schedule the processing of multiple blockchain transactions based on various computer resources (e.g., CPU resources, storage resources, and network resources). In some embodiments, the smart contract/platform/TEE runners 317 are configured to support the testing and running of smart contracts, various platforms, and a trusted execution environment (TEE) for executing blockchain transactions. In some embodiments, the executor 304 can be configured to support various blockchain service environments, such as native smart contracts, virtual machines, and TEE. In some embodiments, the storage plugin 306 can be configured to perform conflict detection among the multiple blockchain transactions, world state management, and key-value (KV) pair management.

In some embodiments, the storage kernel 308 can be configured to store blockchain data, such as block data, state data, index data, and/or stream data. As an example of block data, a blockchain block can include a block header and a block body. The block header can include identity information of a particular block and the block body can include transactions that are confirmed with the block. In some embodiments, state data can be assembled to a globally shared state (also referred to as a world state). The world state can include a mapping between an account address and an account state. The world state can be stored in data structures such as a Merkle Patricia tree (MPT). In some embodiments, the state data can be further categorized into a current state and a history state. In some embodiments, the current state is the state data corresponding to the latest block and is the data source when the latest transaction on the blockchain network is executed. In some embodiments, the history state is a content-addressed data set that stores all state data from the genesis block to the latest block. In some embodiments, the historical state data is stored in a historic state tree. In some embodiments, the index data can indicate a mapping correspondence between the data (e.g., transaction data, block data, and state data) and data log files that store the data so as to address or retrieve the data. In some embodiments, the index data can indicate a physical location of a corresponding data stored in a storage system. In some embodiments, the stream data can be data (e.g., configurations or metadata) related to a stream, a construct, or a processing engine for processing a certain type of blockchain data.

In some embodiments, the blockchain data can be stored in database 320 on storage devices 321. In some embodiments, the storage kernel 308 can receive input/out (I/O) operations for accessing the blockchain data via storage kernel application programming interface (API) 318. In some embodiments, the I/O operations can include synchronous PUT/GET requests and asynchronous PUT/GET requests. In one example, the I/O operation may include a request to retrieve a value of a KV pair based on a key. In this example, the storage kernel 308 can obtain a hash value of the key, find a corresponding node from a stored Merkel tree 319, determine a new key recognizable by the database 320 according to the information of the node, and use this new key to read the requested value from the database 320.

In some embodiments, the blockchain system 300 can receive multiple blockchain transactions to be executed or processed. A blockchain transaction can include one or more tasks, functions, or operations 305 such as verifying the blockchain transaction (e.g., verifying whether a consensus of the blockchain transaction can be reached in the blockchain network), committing the blockchain transaction in response to a successful verification of the blockchain transaction, writing data or other information of the blockchain transaction into the database (e.g., the database 320), and/or function prologue and epilogue declaration, compiling or other management (e.g., reserving space for variables, cleaning up a stack before the function is done and returns to a caller of the function) for performing different operations/function in the blockchain transaction. Some of the tasks or functions within the blockchain transaction can be CPU-bound, such as the verification or commit operations. Some of the tasks or functions within the blockchain transaction can be I/O-bound, such as, writing blockchain data into or reading blockchain data from the database.

In some embodiments, the blockchain system 300 can use the first thread pool 310 to process multiple blockchain transactions, for example, in sequence and/or in parallel. In some embodiments, the first thread pool 310 can include multiple threads (e.g., K threads, where K is an integer greater than one), where each thread can be used to execute one or more blockchain transactions such that multiple blockchain transactions can be executed by the multiple threads in parallel. In one example, the blockchain system 300 may receive a number of (e.g., M) blockchain transactions to be executed, where M is an integer greater than one. In this example, a number of (e.g., N) blockchain transactions may be selected out of the M blockchain transactions such that the N blockchain transaction is a subset of the M blockchain transactions. In some embodiment, the N blockchain transactions can be identified as candidate blockchain transactions for parallel processing and selected from the M blockchain transactions. The candidate blockchain transactions for parallel processing include blockchain transactions that can be performed independently without relying on or altering execution outcomes of each other. The candidate blockchain transactions for parallel processing can be identified, for example, based on one or more conflict detection algorithms that detect whether a conflict exists between or among execution of the multiple blockchain transactions. A conflict can exist between or among execution of two or more blockchain transactions if changing an execution order of two or more blockchain transactions can cause an execution error (e.g., not able to execute one operation of a blockchain transaction) or can change the execution outcome or result of the two or more blockchain transactions. In some embodiments, the conflict detection algorithm can identify blockchain transactions that are not subject to conflicts. Accordingly, the candidate blockchain transactions for parallel processing can be identified among the one or more blockchain transactions that are not subject to conflicts.

After identifying the N blockchain transactions as the candidate blockchain transactions qualifying for parallel processing, the blockchain system 300 may distribute the N blockchain transactions to be executed by the K threads in the first thread pool 310, where a respective number of (e.g., $N_K$) blockchain transactions out of the N blockchain transactions is distributed to a respective $K^{th}$ thread. For example, a number of $N_1$ blockchain transactions out of the N transactions may be distributed to a first thread in the first thread pool 310, a number of $N_2$ blockchain transactions out of the N transactions may be distributed to a second thread in the first thread pool 310, a number of $N_3$ blockchain transactions out of the N transactions may be distributed to a third thread in the first thread pool 310, and so forth. As such, executing the $N_1$ blockchain transactions using the first thread can be in parallel with executing the $N_2$ blockchain transactions using the second thread and executing other blockchain transactions using other threads (e.g., executing $N_3$ blockchain transactions out of the N transactions using a third thread in the first thread pool 310).

In some embodiments, in addition to parallel processing using the multiple threads in the first thread pool 310, blockchain transactions distributed to the same thread in the first thread pool can be executed asynchronously. Asynchronous execution allows a blockchain transaction to be executed before receiving an execution result of a prior blockchain transaction. In other words, the blockchain transaction does not need to wait after the prior blockchain transaction is fully executed to start executing. In some embodiments, coroutines are generated to allow the blockchain transactions to be executed asynchronously, for example, by starting execution of the blockchain transaction after invoking a coroutine to execute the prior blockchain transaction (or some operations of the prior blockchain transaction).

In the example depicted in FIG. 3, each one of the K threads in the thread pool 310 can execute one or more coroutines 311. The coroutines can allow the blockchain transactions to be executed asynchronously to achieve concurrent processing of the blockchain transactions. In some embodiments, one or more coroutines can be generated for each blockchain transaction. In one example, a number of $N_1$ blockchain transactions out of the N transactions may be distributed to a first thread in the first thread pool 310. In this example, a number of $P_1$ coroutines to be executed asynchronously may be identified and generated based on the $N_1$ blockchain transactions, where $P_1$ is larger than or equal to $N_1$. The $N_1$ blockchain transactions can then be executed by executing the $P_1$ coroutines asynchronously. In some embodiments, one coroutine can be generated for one blockchain transaction. In some embodiments, one coroutine can be generated for multiple blockchain transactions. In some embodiments, more than one coroutine can be generated for one blockchain transaction. For example, a blockchain transaction may include two tasks or operations (e.g., two data retrievals from one or more blockchain storage device) that do not depend on the execution of each other. In this example, two coroutines may be generated for the two operations respectively such that the two operations of the same blockchain transaction can be executed asynchronously using the two coroutines. In some embodiments, coroutines can be generated for blockchain transactions based on types of the blockchain transactions or tasks or operations of the blockchain transactions (e.g., whether they are I/O-bound or CPU-bound). In some embodiments, a coroutine can be generated for an I/O-bound blockchain transaction or an I/O-bound task of the blockchain transaction (e.g., the blockchain transaction that includes one or more I/O operations that access a blockchain storage system. In some embodiments, coroutines can be generated for one or more tasks or operations that may render a processor to wait or idle for a result of a previous task or operation in the same blockchain transaction. For example, a coroutine can be generated for an operation that awaits an interruption or a user input such that operations subsequent to the operation can be executed once the coroutine is invoked and a coroutine switch is performed. When the awaited information of the operation is received, the blockchain transaction can return to and complete the operation.

In some embodiments, a scheduler (e.g., the scheduler 316) can be configured to schedule processing of multiple coroutines (e.g., the coroutines 311) to better exploit the computer resources (e.g., CPU resources, storage resources, network resources) and further improve the processing efficiency of the blockchain transactions. For example, the multiple coroutines can reuse one or more threads in the first thread pool 310 or use additional threads such as the second thread pool 312 to achieve concurrent processing of the coroutines and the underlying blockchain transactions.

In the above example, executing the $P_1$ coroutines may include accessing blockchain data stored in the storage kernel 308 using the second thread pool 312. In some embodiments, the second thread pool 312 can be dedicated to the storage kernel 308 and the scheduler 316 can use threads in the second thread pool 312 in response to determining one or more coroutines include I/O operations to access blockchain data stored in the storage kernel 308.

Figure 4:
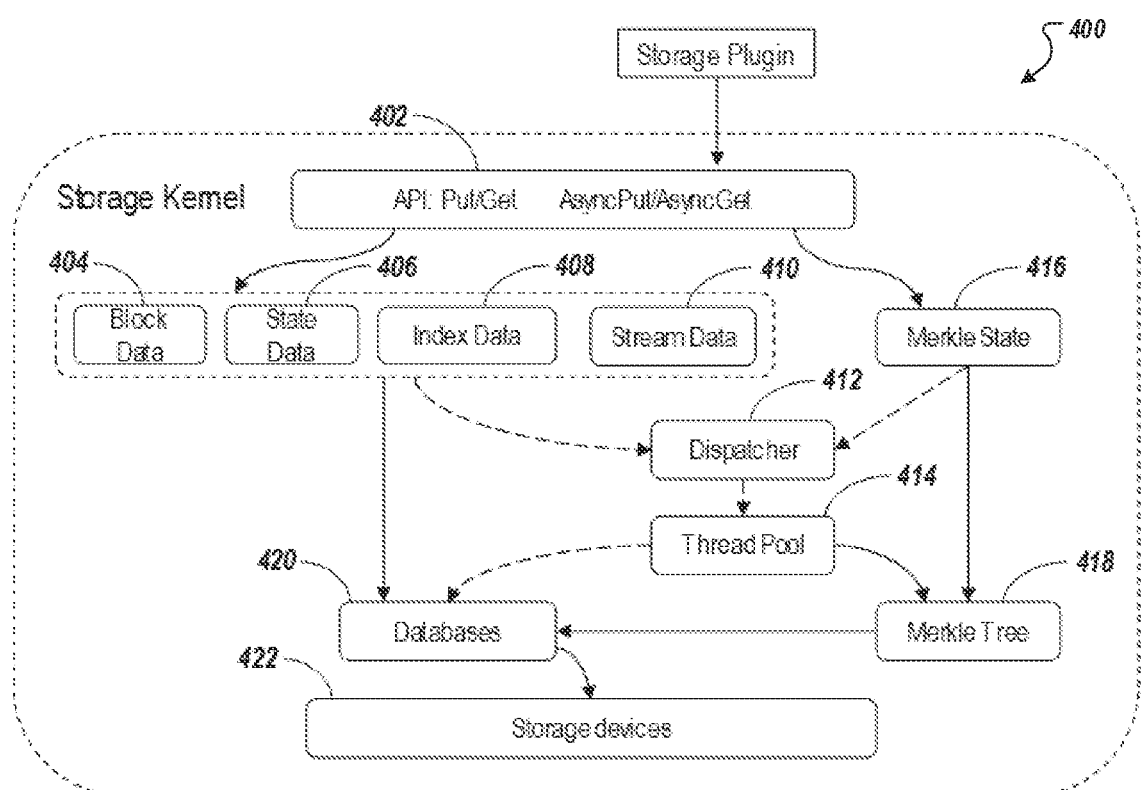
FIG. 4 is a diagram illustrating an example of a storage kernel in accordance with embodiments of this specification.

FIG. 4 is a diagram illustrating an example of a storage kernel 400 of a blockchain storage system in accordance with embodiments of this specification. In some embodiments, the storage kernel 400 can be implemented as the storage kernel 308 of FIG. 3. As shown, the storage kernel 400 includes an I/O API 402 that supports synchronous GET/PUT requests and asynchronous GET/PUT requests, for example, similar to the storage kernel API 318 of FIG. 3.

The storage kernel 400 also includes one or more storage devices 422 that store blockchain data. In some embodiments, different types of the blockchain data can be stored separately in respective storage devices, or be mixed and stored in one or more common storage devices. In one example, the one or more storage devices 422 may include a first storage device for storing block data 404, a second storage device for storing state data 406, a third storage device for storing index data 408, and a fourth storage device for storing stream data 410. The block data 404, state data 406, index data 408, and stream data 410 may be stored in their respective databases 420 on the storage devices 422.

In some embodiments, a thread pool, e.g., thread pool 414 including multiple threads, is dedicated to the storage kernel 400. The thread pool 414 can be an example of the second thread pool 312 of FIG. 3. In some embodiments, the threads in the thread pool 414 can be configured to access one or more of the storage devices 422 in parallel. As an example, a first thread in the thread pool 414 may be configured to access the first storage device that stores block data, a second thread in the thread pool 414 may be configured to access the second storage device that stores block data, a third thread in the thread pool 414 may be configured to access the third storage device that stores index data, and a fourth thread in the thread pool 414 may be configured to access the fourth storage device that stores streaming data. As another example, multiple threads can be used to access a same or single storage device to leverage the multi-access capability supported by the storage device to increase the throughput of storage kernel 400 and the efficiency of I/O operations on the storage kernel 400.

The storage kernel 400 further includes a scheduler or dispatcher 412 that schedules I/O operations, for example, based on characteristics of the I/O operations and computer resources according to one or more scheduling algorithms. In some embodiments, the dispatcher 412 can schedule two or more threads in the thread pool 414 based on a round robin scheduling algorithm, a random hash scheduling algorithm, or other algorithms.

In some embodiments, the storage kernel 400 may receive multiple I/O operations via the I/O API 402. In some embodiments, the multiple I/O operations are from one or more blockchain transactions or coroutines of one or more blockchain transactions. In one example, each one of the I/O operations may include a request to retrieve a value corresponding to a blockchain data (e.g., block data 404, state data 406, index data 408, or stream data 410) based on a key associated with the value in a KV pair. In this example, the dispatcher 412 may determine a data type of the requested values of the I/O operations, and schedule the I/O operations for the threads in the thread pool 414. In some embodiments, multiple I/O operations can be scheduled for multiple threads respectively such that the multiple I/O operations can be executed in parallel using the multiple threads. For each one of the I/O operations, the storage kernel 400 may obtain a hash value of the key included in the request, find a corresponding node from a stored Merkel tree 418, determine a new key recognizable by a corresponding database 420 according to the information of the node, and use this new key to read the requested value from the databases 420.

In some embodiments, the parallel execution of the multiple I/O operations enables concurrent execution of the multiple coroutines and blockchain transactions, especially given the thread pool 414 of the storage kernel 400 that is separated and in addition to one or more threads (e.g., the threads in the first thread pool 310 of FIG. 3) allocated to execute the blockchain transactions.

Figure 5:
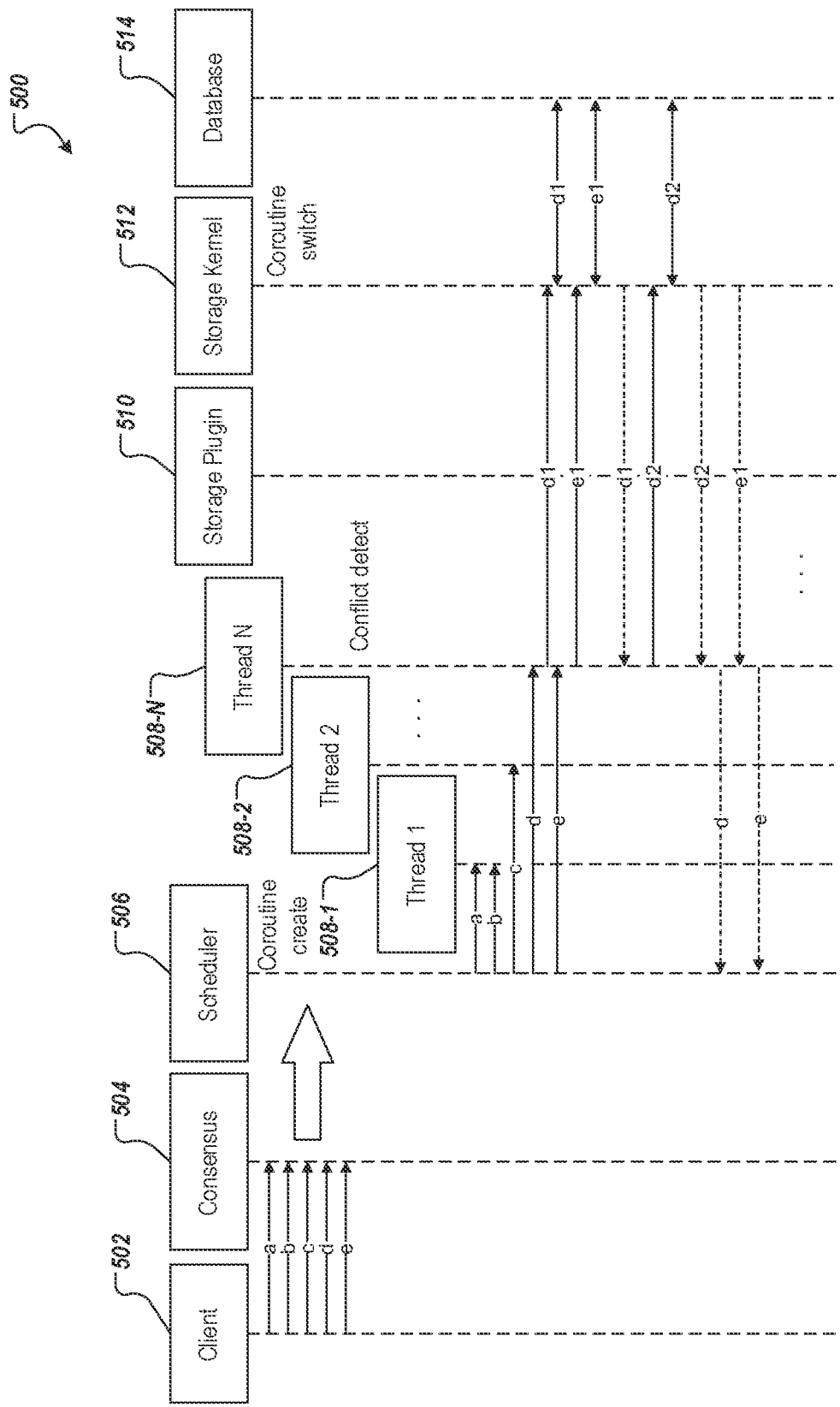
FIG. 5 is a graph illustrating an example of a process for processing blockchain transactions that can be executed in accordance with embodiments of this specification.

FIG. 5 illustrates an example of a process 500 for processing blockchain transactions that can be executed in accordance with embodiments of this specification. For convenience, the process will be described as being performed by a system of one or more computers, located in one or more locations, and programmed appropriately in accordance with this specification. For example, a blockchain-based system (e.g., the blockchain system 300 of FIG. 3), appropriately programmed, can perform the process 500. In some embodiments, each network node of a blockchain network (e.g., node 214 of FIG. 2), appropriately programmed, can perform the process 500. The network node can be, for example, a consensus node or non-consensus node. The network node can be, for example, a participant system of a blockchain network, e.g., participant system 202, 204, or 206 of FIG. 2.

In the depicted example, a client 502 may send a request or multiple requests to process multiple blockchain transactions. The client 502 can include one or more user interfaces or other communication interfaces for interfacing with a user and/or more other network nodes of a blockchain network. For example, the client 502 can receive multiple blockchain transactions from a user associated with the client 502 and/or more other network nodes of the blockchain network. In some embodiments, the multiple blockchain transactions can be blockchain transactions received during a block generation period of the blockchain network so that a new block including the multiple blockchain transactions can be added to a blockchain maintained by the blockchain network.

In this example, five blockchain transactions a-e are received by the client 502 and are sent to a consensus module 504 of the blockchain-based system for processing. In some embodiments, the consensus module 504 can perform a consensus procedure on the blockchain transactions. After determining that a consensus has been reached, the five blockchain transactions a-e can be sent to a scheduler 506 for execution.

In some embodiments, the scheduler 506 can assign or otherwise distribute the multiple blockchain transactions to available threads in a thread pool (e.g., the first thread pool 310 of FIG. 3). An available thread may be allocated with one or more blockchain transactions. In this example, the five blockchain transactions a-e are scheduled on threads 508-1~508-N. As shown, blockchain transactions a and b are scheduled for thread 508-1, blockchain transaction c is scheduled for thread 508-2, and blockchain transactions d and e are scheduled for thread 508-N. In some embodiments, the multiple blockchain transactions can be executed in parallel using multiple threads. In this example, execution of blockchain transactions a and b using thread 508-1, execution of blockchain transaction c using thread 508-2, and execution of blockchain transactions 508-N can be performed in parallel.

In some embodiments, one or more coroutines can be created or generated for each one of the blockchain transactions. The example in FIG. 5 shows coroutines are created for blockchain transactions d and e to facilitate asynchronous processing of the blockchain transactions d and e, even though they are assigned to be processed by the same thread 508-N.

In some embodiments, each one of the blockchain transactions can include one or more I/O-bound operations such as I/O operations that access blockchain data stored in the system, CPU-bound operations, or other operations. In some embodiments, one or more coroutines can be created for one or more operations (e.g., I/O operations) in the blockchain transactions that require a wait time or may cause a suspension or idle of the computing resource (e.g., the thread processing the blockchain transaction). In some embodiments, one or more coroutines can be created for one or more operations according to a conflict detection algorithm such that the one or more operations can be executed asynchronously without changing a execution result of the one or more operations as if the one or more operations were executed synchronously or sequentially. For example, a blockchain transaction can be constructed as a computer code or program that includes two or more operations. The computer program can be written in a synchronous manner in that the two or more operations are to be executed one after another according to the order programmed in the computer program. A conflict can exist between or among execution of two or more operations if changing an execution order of two or more operations (e.g., starting execution of a subsequent operation before a prior operation is completed) can cause an execution error (e.g., not able to execute a subsequent operation) or can change the execution outcome or result of the two or more operations. In some embodiments, the conflict detection algorithm can identify operations that are not subject to conflicts. Accordingly, one or more coroutines can be created for the one or more operations that are not subject to conflicts.

In the example shown in FIG. 5, blockchain transaction d includes two I/O operations d1 and d2, and blockchain transaction e includes an I/O operation e1. Note that FIG. 5 is illustrated as including I/O operations d1, d2, and e1 for illustrative purposes only. Each one of the blockchain transactions a-e can include any suitable number of I/O operations and/or non-I/O operations. In some embodiments, respective coroutines can be created for I/O operations d1, d2, and e1. In some embodiments, fewer, additional, or different coroutines can be created based on the blockchain transactions and the operations included in the blockchain transactions.

In some embodiments, the blockchain transactions and the coroutines of the blockchain transactions (e.g., based on I/O operations) can be scheduled for execution in parallel and asynchronously based on a conflict detection algorithm. For example, it may be determined, based on the conflict detection algorithm, that execution of the I/O operation d2 depends on the execution of the I/O operation d1, such that the I/O operation d2 can be executed after completion of execution of I/O operation d1. On the other hand, it may be determined, based on the conflict detection algorithm, that the I/O operation e1 has no dependency on the I/O operations d1 and d2. As such, the I/O operation e1 can be executed asynchronously with the I/O operations d1 and d2. In some embodiments, operation d1 may be executed first to access blockchain data stored in database 514. In some embodiments, a coroutine is created for each one of the blockchain transactions. In this case, the I/O operations d1 and d2 of the transaction d can be executed using a coroutine created for the transaction d, and the I/O operation e1 can be executed using another coroutine created for the transaction e. In some embodiments, when an I/O operation has been executed to a point where the I/O operation needs to access a disk storage, a coroutine switch can be performed for the I/O operation. In some embodiments, a coroutine switch can include saving an operating context of a first coroutine for executing a first operation and switching to a second coroutine for executing a second operation.

Continuing with the above example, when the I/O operation d1 accesses the database 514 to retrieve blockchain data, the operating context of the coroutine for the transaction d may be saved. In some embodiments, saving the operation context of the coroutine for executing an operation can include saving the register data, stack pointer, and/or program counter or environment associated with the coroutine. After saving the operating context of the coroutine for I/O operation d1, computing resources (e.g., the thread 508-N) can then be freed up, for example, to execute the I/O operation e1. As such, asynchronous execution of I/O operations d1 and e1 can be achieved such that execution of the I/O operation e1 does not wait for the completion of the execution of I/O operation d1. In some embodiments, I/O operations d1 and e1 can use one or more threads different from the thread 508-N (e.g., the threads dedicated to the storage kernel 512) to further improve the processing efficiency, for example, according to techniques described with respect to FIG. 6. In some embodiments, the I/O operations d1 and e1 can use two respective threads to achieve parallel processing.

In the above example, the I/O operation d1 may return an execution result before completion of I/O operation e1. In some embodiments, a coroutine switch may be performed to switch from the coroutine for executing the I/O operation e1 back to the coroutine for executing the I/O operation d1. Execution of the I/O operation d1 can then be resumed. Following completion of the execution of the I/O operation d1 after receiving the execution result, the I/O operation d2 may be executed (e.g., using the same coroutine for executing the I/O operation d1).

In the example depicted in FIG. 5, after the I/O operation d2 returns an execution result, the execution results of the I/O operations d1 and d2 can be returned for execution of the blockchain transaction d. In some embodiments, following completion of execution of the I/O operation d2, a coroutine switch can be performed to switch from the coroutine for executing I/O operation d2 to the coroutine for executing the I/O operation e1. The execution of the I/O operation e1 can then be resumed. After the I/O operation e1 returns an execution result, the execution result of the I/O operation e1 can be returned for execution of the blockchain transaction e. In this example, although the blockchain transactions d and e are scheduled to be processed by the same thread 508-N, they are processed asynchronously by using the coroutines. The execution of the blockchain transaction e does not need to wait until completion of the blockchain transaction d to start, reducing the total execution time of blockchain transactions d and e and making more efficient use of the thread 508-N.

Figure 6:
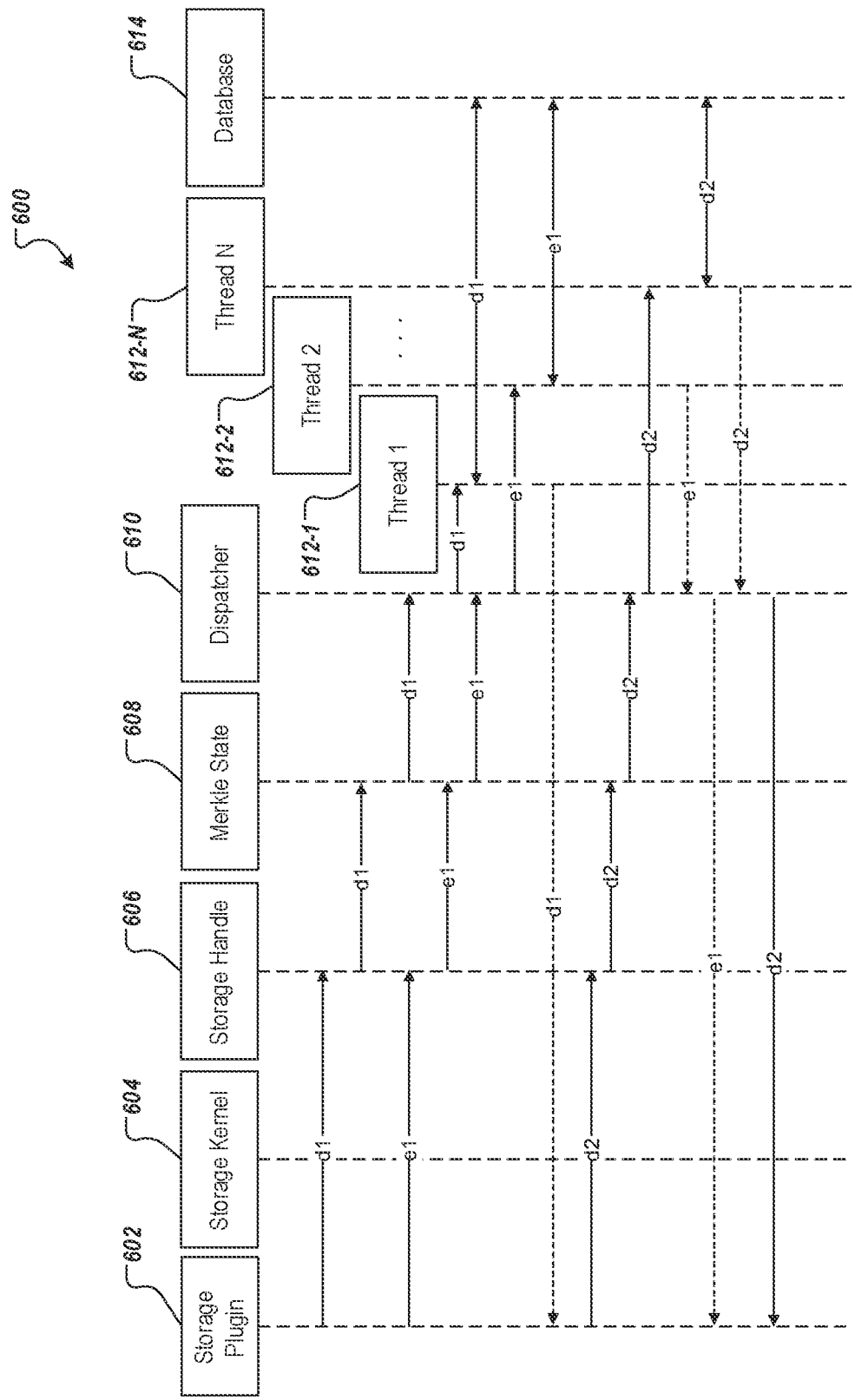
FIG. 6 is a graph illustrating an example of a process for accessing blockchain data stored in a storage system that can be executed in accordance with embodiments of this specification.

FIG. 6 illustrates an example of a process 600 for accessing blockchain data stored in a storage system that can be executed in accordance with embodiments of this specification. For convenience, the process will be described as being performed by a system of one or more computers, located in one or more locations, and programmed appropriately in accordance with this specification. For example, a blockchain-based storage system (e.g., the system 400 of FIG. 4), appropriately programmed, can perform the process 600. The process 600 can be an example process for accessing blockchain data stored in the database 514 of FIG. 5.

In the depicted example, the storage kernel 604 receives I/O operations d1, d2, and e1 from storage plugin 602. The I/O operations d1, d2, and e1 can be I/O operations included in one or more blockchain transactions. Note that FIG. 6 is illustrated as including the I/O operations d1, d2, and e1 for illustrative purposes only. The I/O operations d1, d2, and e1 in FIG. 6 can be considered the same as or different from the I/O operations d1, d2, and e1 in FIG. 5.

In this example, each one of the I/O operations d1, d2, and e1 can include a request to retrieve a value corresponding to a blockchain data (e.g., block data 404, state data 406, index data 408, or stream data 410) from the database 614 based on a key associated with the value. The dispatcher 610 may determine a data type of the requested values in the I/O operations, and schedule the I/O operations d1, d2, and e1 for the threads 612-1~612-N. The threads 612-1~612-N may be the same as or different from one or more threads (e.g., threads 508-1~508-N) that are scheduled to process the blockchain transactions in which the I/O operations d1, d2, and e1 are included. In this example, the threads 612-1~612-N may be a thread pool that is dedicated to the storage kernel 604, which are different from the threads (e.g., the threads 508-1~508-N) that are scheduled to process the blockchain transactions. As shown, the I/O operations d1, d2, and e1 are distributed to the thread 612-1, 612-N, and 612-2, respectively. In some embodiments, multiple I/O operations can be scheduled for multiple threads respectively such that the multiple I/O requests can be executed in parallel using the multiple threads. In this example, the I/O operations d1, d2, and e1 may be executed in parallel using the threads 612-1, 612-N, and 612-2, respectively.

Figure 7:
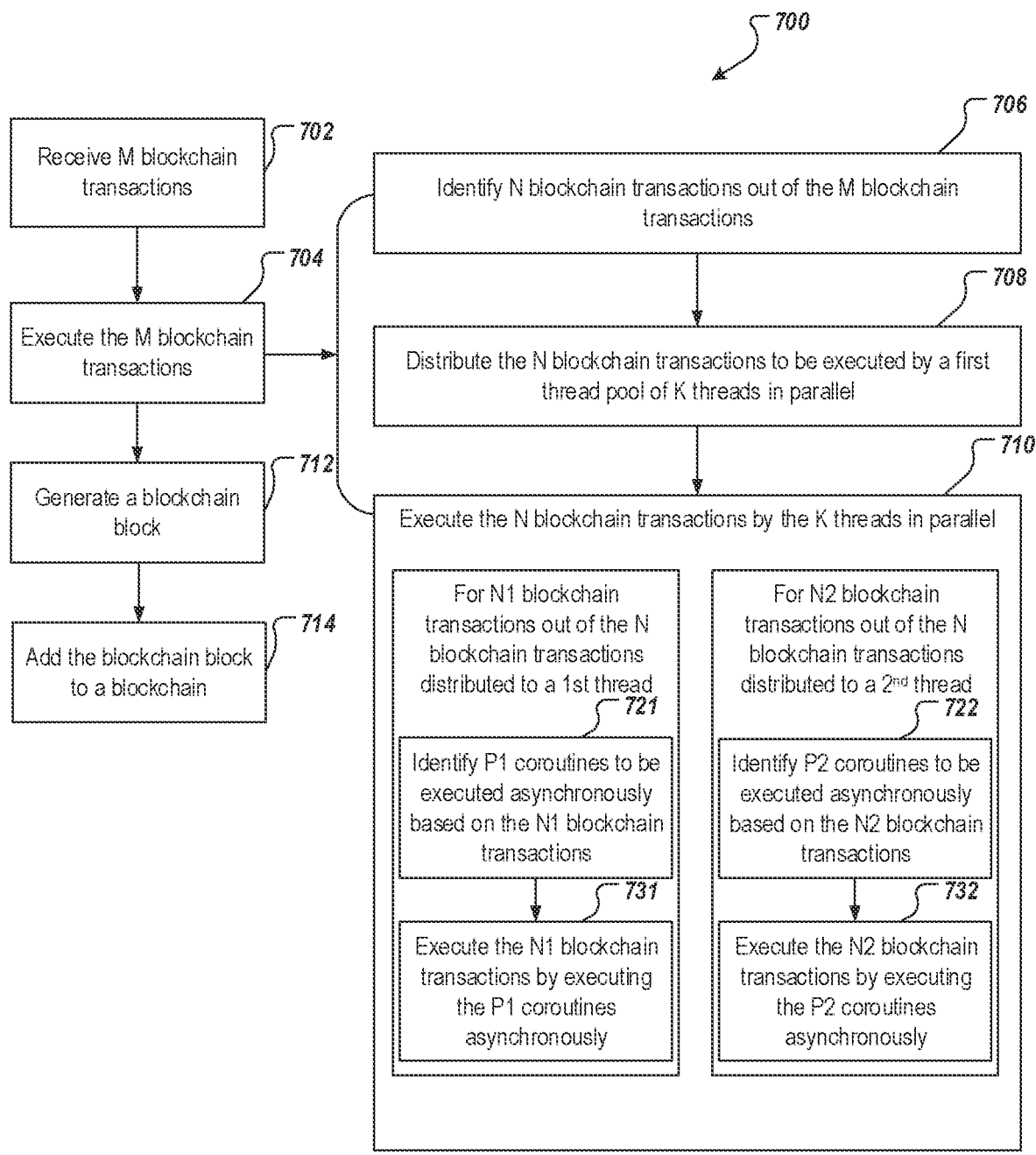
FIG. 7 is a flowchart illustrating an example of a process of processing blockchain transactions that can be executed in accordance with embodiments of this specification.

FIG. 7 is a flowchart illustrating an example of a process 700 that can be executed in accordance with embodiments of this specification. The flow chart represents a process 700 for processing blockchain transactions. For convenience, the process will be described as being performed by a system of one or more computers, located in one or more locations, and programmed appropriately in accordance with this specification. For example, a blockchain-based system (e.g., the blockchain system 300 of FIG. 3), appropriately programmed, can perform the process. In some embodiments, the blockchain-based system can be implemented on a blockchain network node (e.g., blockchain network node 214 of FIG. 2).

At step 702, a blockchain network node of a blockchain network receives M blockchain transactions to be executed by the blockchain network node. In some embodiments, the blockchain network node is associated with a storage system (e.g., storage kernel 308 of FIG. 3 or storage kernel 400 of FIG. 4) that stores blockchain data in a blockchain, and M is an integer greater than one. The blockchain network node can maintain the blockchain that includes a series of blocks for storing blockchain data. The blockchain network node can receive multiple blockchain transactions, perform consensus on the multiple blockchain transactions, and generate a block that includes the multiple blockchain transactions if a consensus has been reached on the multiple blockchain transactions. The generated block can be appended to the blockchain maintained by the blockchain node. In some embodiments, the M blockchain transactions can be blockchain transactions received by the blockchain node during a block generation interval, to be executed by the blockchain network node, and to be included in a block of the blockchain for storage or publication.

At step 704, the blockchain network node executes the M blockchain transactions. In some embodiments, the blockchain network node executes the M blockchain transactions in response to determining a consensus has been reached among all consensus nodes of the blockchain network with respect to the multiple blockchain transactions. In some embodiments, some or all of the M blockchain transactions can be executed concurrently to improve the execution efficiency and reduce the processing delay of the block generation of the network node. In some embodiments, step 704 includes sub-steps 706-710.

At step 706, the blockchain network node identifies N blockchain transactions out of the M blockchain transactions, where N is smaller than or equal to M. In some embodiment, the N blockchain transactions can be selected based on a conflict detection on the M blockchain transactions, for example, according to the example techniques described with respect to FIGS. 3-5. For example, the N blockchain transactions are candidate blockchain transactions for parallel processing that can be performed independently without relying on or altering execution outcomes of each other.

At step 708, the blockchain network node distributes the N blockchain transactions to be executed by a first thread pool (e.g., thread pool 310 of FIG. 3) of K threads in parallel. In some embodiments, the blockchain network node distributes the N blockchain transactions to be executed by the first thread pool after identifying the N blockchain transactions as the candidate blockchain transactions qualifying for parallel processing. In some embodiments, a respective number of $N_K$ blockchain transactions out of the N blockchain transactions is distributed to a respective $K^{th}$ thread. For example, $N_1$ blockchain transactions out of the N transactions may be distributed to a first thread, $N_2$ blockchain transactions out of the N transactions may be distributed to a second thread, a number of $N_3$ blockchain transactions out of the N transactions may be distributed to a third thread, and so forth. As such, executing the $N_1$ blockchain transactions using the first thread can be in parallel with executing the $N_2$ blockchain transactions using the second thread and executing other blockchain transactions using other threads (e.g., executing the $N_3$ blockchain transactions out the third thread in the first thread pool).

At step 710, the N blockchain transactions are executed by the K threads in parallel. In some embodiments, in addition to parallel processing using the multiple threads in the first thread pool, blockchain transactions distributed to the same thread in the first thread pool can be executed asynchronously. Asynchronous execution allows a blockchain transaction to be executed before receiving an execution result of a prior blockchain transaction. In other words, the blockchain transaction does not need to wait after the prior blockchain transaction is fully executed to start executing. In some embodiments, coroutines are generated to allow the blockchain transactions to be executed asynchronously, for example, by starting execution of the blockchain transaction after invoking a coroutine to execute the prior blockchain transaction (or some operations of the prior blockchain transaction).

Continuing with the above example, execution of the $N_1$ blockchain transactions can be in parallel with the execution of $N_2$ blockchain transactions. In some embodiments, for the $N_1$ blockchain transactions out of the N blockchain transactions distributed to a first thread in the first thread pool, at step 721, $P_1$ coroutines to be executed asynchronously can be identified based on the $N_1$ blockchain transactions, where $P_1$ is larger than or equal to $N_1$. For example, one or more coroutines may be generated for each one of the $N_1$ blockchain transactions. At step 731, the $N_1$ blockchain transactions can then be executed by executing the $P_1$ coroutines asynchronously. Similarly, for the $N_2$ blockchain transactions out of the N blockchain transactions distributed to a second thread in the first thread pool, at step 732, $P_2$ coroutines to be executed asynchronously can be identified based on the $N_2$ blockchain transactions. At step 732, the $N_2$ blockchain transactions can then be executed by executing the $P_2$ coroutines asynchronously.

In some embodiments, coroutines can be generated for blockchain transactions based on types of the blockchain transactions or tasks or operations of the blockchain transactions (e.g., whether they are I/O-bound or CPU-bound). In some embodiments, a coroutine can be generated for an I/O-bound blockchain transaction or an I/O-bound task of the blockchain transaction (e.g., the blockchain transaction that includes one or more I/O operations that access a blockchain storage system. In some embodiments, coroutines can be generated for one or more tasks or operations that may render a processor to wait or idle for a result of a previous task or operation in the same blockchain transaction. For example, a coroutine can be generated for an operation that awaits an interruption or a user input such that operations subsequent to the operation can be executed once the coroutine is invoked and a coroutine switch is performed. When the awaited information of the operation is received, the blockchain transaction can return to and complete the operation.

In some embodiments, identifying the $P_1$ coroutines to be executed asynchronously based on the $N_1$ blockchain transactions includes identifying one or more coroutines to be executed asynchronously for each of the $N_1$ blockchain transactions. In some embodiments, executing the $P_1$ coroutines asynchronously includes accessing blockchain data stored in the storage system using a second thread pool (e.g., thread pool 312 of FIG. 3 or thread pool 414 of FIG. 4), where the second thread pool is different from the first thread pool. In some embodiments, the second thread pool is dedicated to the storage system. In some embodiments, accessing blockchain data stored in the storage system includes one or more of the following: reading data stored in the blockchain stored in the storage system, or writing new data into the blockchain. In some embodiments, the blockchain data includes one or more of block data, state data, index data, or stream data.

In some embodiments, different types of the blockchain data can be stored separately in respective storage devices, or be mixed and stored in one or more common storage devices. In one example, the storage system may include a first storage device for storing block data, a second storage device for storing state data, a third storage device for storing index data, and a fourth storage device for storing stream data. The block data, state data, index data, and stream data may be stored in their respective databases on the storage devices of the storage system.

In some embodiments, the threads in the second thread pool can be configured to access one or more of the storage devices of the storage system in parallel. As an example, a first thread in the second thread pool may be configured to access the first storage device that stores block data, a second thread in the second thread pool may be configured to access the second storage device that stores block data, a third thread in the second thread pool may be configured to access the third storage device that stores index data, and a fourth thread in the second thread pool may be configured to access the fourth storage device that stores streaming data. As another example, multiple threads can be used to access a same or single storage device to leverage the multi-access capability supported by the storage device to increase the throughput of storage system and the efficiency of I/O operations on the storage system.

In some embodiments, the $N_1$ blockchain transactions include a series of operations, where the series of operations can include a first operation and a second operation subsequent to the first operation. In some embodiments, the first operation can be an I/O operation accessing the storage system. In some embodiments, the I/O operation includes at least one of an asynchronous GET request or an asynchronous PUT request.

In some embodiments, the $P_1$ coroutines include a first coroutine and a second coroutine. In some embodiments, executing the $N_1$ blockchain transactions by executing the $P_1$ coroutines asynchronously includes: executing the first operation using the first coroutine, and executing the second operation asynchronously with the first operation. In some embodiments, executing the second operation asynchronously with the first operation includes executing the second operation using the second coroutine before receiving an execution result of the first operation. For example, the execution of the second operation using the second coroutine does not need to wait until completion of the first operation to start, reducing the total execution time of the first and the second operations and making more efficient use of the thread 508-N.

In some embodiments, executing the second operation using the second coroutine before receiving an execution result of the first operation includes: saving a first operation context of the first operation; and performing a context switch from a first operation context of the first operation to a second operation context of the second operation. In some embodiments, the first operation context includes at least one of the register data, stack pointer, or program counter of the first operation.

In some embodiments, the first coroutine includes a callback identifier corresponding to a callback function of the first operation. In some embodiments, executing the second operation asynchronously with the first operation further includes: receiving a value returned by the callback function of the first operation; saving a second operation context of the second operation; restoring the first operation context of the first operation; and resuming execution of the first operation based on the value returned by the callback function of the first operation.

At step 712, the blockchain network node generates a blockchain block including the M blockchain transactions after executing the M blockchain transactions. In some embodiments, one or more of the M blockchain transactions are executed after executing the N blockchain transactions. For example, the one or more of the M blockchain transactions may be executed in series or synchronously with the N blockchain transactions.

At step 714, the blockchain network node adds or appends the blockchain block to the blockchain in the storage system associated with the blockchain network node.

As noted, a blockchain transaction can include one or more operations for completing one or more tasks or functions, such as verifying the blockchain transaction (e.g., verifying whether a consensus of the blockchain transaction can be reached in the blockchain network), committing the blockchain transaction in response to a successful verification of the blockchain transaction, writing data or other information of the blockchain transaction into a block of a blockchain or another database, declaring prologue and epilogue of functions, and/or compiling or other management (e.g., reserving space for variables, cleaning up a stack before the function is done and returning to a caller of the function).

In some embodiments, a blockchain transaction can be associated with a transaction type. In some embodiments, the transaction type can be classified based on one or more functions that the blockchain transaction is to achieve or perform, or a computational environment or system that the blockchain transaction involves. For example, the transaction type can include a verification transaction, a commit transaction, an encryption transaction, a TEE transaction (e.g., a transaction performed in the TEE environment), a virtual-machine-based transaction (e.g., a WASM transaction or an EVM transaction), an asset transfer transaction, an account inquiry transaction, a certificate storage transaction (e.g., for storing data in the blockchain as certificate or evidence), or a native smart contract transactions (e.g., a smart contact transaction that does not need a virtual machine to be executed), etc. A blockchain network or system can include additional or different transactions.

In some embodiments, execution of the blockchain transactions of different transaction types can require different amount of computational resources (e.g., CPU resources, I/O resources, and network resources). In one example, an asset transfer transaction can include a large amount of read/write operations accessing a storage system (e.g., the disk) but a relative smaller amount of logic computations, thereby requiring a relatively larger amount of I/O resources for processing the read/write operations than CPU resources for processing the logic computations. In another example, a virtual-machine-based transaction, e.g., a WASM smart contract transaction, can include a large amount of smart contract logic computations but a small amount of read/write operations accessing the storage system, thereby requiring a relatively larger amount of CPU resources for processing the logic computations than I/O resources for accessing the storage. In some embodiments, blockchain transactions with different transaction types can be classified with different bound-types (e.g., CPU-bound or I/O-bound), for example, based on the different amount of computational resources needed for executing the blockchain transactions.

In some embodiments, the blockchain transactions (e.g., more than one blockchain transaction) can be further categorized as CPU-bound blockchain transactions or I/O-bound blockchain transactions. For example, when the CPU's processing speed is not fast enough to process all the multiple blockchain transactions that are waiting to be processed (e.g., during a blockchain block generation duration), the multiple blockchain transactions can be classified as CPU-bound blockchain transactions (in other words, the multiple blockchain transactions are bottlenecked by the CPU). Analogously, when the U/O capacity of the system is not fast enough to process all the multiple blockchain transactions that are waiting to be processed (e.g., during a blockchain block generation duration), the multiple blockchain transactions can classified as I/O-bound blockchain transactions (in other words, the multiple blockchain transactions are bottlenecked by the I/O). In some embodiments, whether one or more blockchain transactions are CPU-bound or I/O-bound can be determined based on the processing capacity (e.g., CPU processing capacity and I/O processing capacity) of the computer system that processes the blockchain transactions. In some embodiments, determining whether one or more blockchain transaction are CPU-bound or I/O-bound can be subject to a current CPU and/or I/O load of the computer system.

In some embodiments, a bound type (e.g., CPU-bound or I/O-bound) of one or more blockchain transactions can be determined based on transaction types of the one or more blockchain transactions. In some embodiments, some types of blockchain transactions can be classified, predetermined, or configured to be CPU-bound or I/O-bound. For example, a type of blockchain transaction that does not include I/O operations (e.g., an encryption transaction, a native smart contract transaction) can be considered as CPU-bound. In some embodiments, a type of blockchain transaction that includes multiple I/O operations (e.g., an asset exchange transaction) can be considered as I/O-bound.

In some embodiments, whether one or more blockchain transactions are CPU-bound or I/O-bound with respect to a processing apparatus (e.g., a blockchain node that receives and processes the blockchain transaction) can be determined based on a monitoring-and-feedback or machine learning process. For example, a training process can be performed on the blockchain transactions to learn how to determine whether a blockchain transaction is CPU-bound or I/O-bound with respect to the processing apparatus. In some embodiments, the training process can be performed based on blockchain transactions having a particular transaction type. In one example, a machine learning algorithm can be used to build a blockchain transaction model based on sample data or training data. In some embodiments, the training data may include historical transaction data of the processing apparatus (e.g., transaction types of processed blockchain transactions), and metrics data of the processing apparatus (e.g., CPU processing capacity and I/O processing capacity of the processing apparatus). In some embodiments, the blockchain transaction model can predict whether a blockchain transaction of a particular transaction type will be I/O-bound or CPU bound based on the historical transaction data and the metrics data of the processing apparatus.

In some embodiments, the historical transaction data of the processing apparatus can include information about the number of blockchain transactions that are processed by the processing apparatus during a specific period (e.g., a day, a week, or a month). The historic transaction data can include information indicating a transaction type of each one of the blockchain transactions. The historic transaction data can include a number of I/O operations and/or non-I/O operations (e.g., CPU-only operations that do not require access to the storage system (e.g., storage disk)) in one or more blockchain transactions. The historic transaction data can include a total number of I/O operations and/or non-I/O operations in the number of blockchain transactions that are processed by the processing apparatus during the specific period. The historic transaction data can include additional or different information of the blockchain transactions.

In some embodiments, the metrics data of the processing apparatus may include data indicating a CPU processing capability and an I/O processing capability of the processing apparatus. The processing capability can indicate the number of non-I/O operations that the processing apparatus can process during a specific period. The metric data of the processing apparatus can include the number of cores or processors of the processing apparatus.

In some embodiments, the I/O processing capability can indicate I/O speed (e.g., the number of I/O operations that the processing apparatus can process during a specific period (e.g., a second, a minute, five minutes, or ten minutes)) or I/O throughput of the processing apparatus (e.g., the amount of data that the processing apparatus can read and/or write during a specific period). The metric data of the processing apparatus can include data indicating the size of the memory/memories of the processing apparatus and read/write speed of the memory/memories. In some embodiments, the metric data of the processing apparatus can further include network metrics of the processing apparatus, e.g., a bandwidth and/or and latency of the processing apparatus for accessing a network (e.g., a remote storage device, a cloud disk, or the Internet).

The training data, including the historical transaction data and metrics data of the processing apparatus, may be fed to and used to train a blockchain transaction model. In some embodiments, a CPU load and I/O load of the processing apparatus when processing a number of blockchain transactions can be determined based on the training data. In some embodiments, the CPU load and I/O load can be determined based on computational resource utilization data of the processing apparatus. In some embodiments, the computational resource utilization data can include real-time or statistical utilization rates (e.g., in terms of percentage) for computational resources consumption for processing the blockchain transactions relative to the overall the computational resource capacity of the processing apparatus and the utilization time of the computational resources. In one example, the CPU load may be determined based on a ratio of the number of the tasks/operations in the blockchain transactions to be processed by the CPU to the number of tasks/operations that the CPU can process during a specific period (e.g., a second, a minute, five minutes, or ten minutes). The I/O load may be determined based on a ratio of the I/O tasks/operations in the blockchain transactions to be processed by the processing apparatus to the number of the I/O tasks/operations that the processing apparatus can process during a specific period.

In some embodiments, the CPU load and I/O load of the processing apparatus can be determined with respect to a particular type of blockchain transactions. For example, a first CPU load and a first I/O load can be determined for blockchain transactions of a first transaction type during a specific period (e.g., a large-scale account transfer task including a significant number, e.g., 100, of account transfer transactions). In this example, the large-scale account transfer task may include a significant number of read/write operations (e.g., I/O operations) of a storage system, thereby placing a significant burden on the I/O components of the processing apparatus. If the processing apparatus has an I/O capacity that is not fast enough to process all the read/write operations of the large-scale account transfer task, an I/O bottleneck may occur during processing the account transfer task. As another example, a second CPU load and a second I/O load can be determined for blockchain transactions of a second transaction type (e.g., an encryption transaction) during a specific period. In this example, a task including a number of encryption transactions may include a significant number of logic computations, thereby placing a significant burden on the CPU of the processing apparatus. If the processing apparatus has a CPU capacity that is not fast enough to process all the logic computations of the encryption transactions, a CPU bottleneck may occur during processing the encryption transactions.

In some embodiments, the bound type (e.g., CPU-bound or I/O-bound) of a blockchain transaction can be determined based on the CPU load and I/O load for a particular transaction type of blockchain transactions. In some embodiments, if the CPU load is equal to or higher than a first threshold, and/or the I/O load is equal to or lower than a second threshold, the blockchain transactions with the particular transaction type can be determined as CPU-bound transactions. For example, the CPU load of the processing apparatus when processing a number of encryption transactions may be higher than a first threshold (e.g., 90%), while the I/O load when processing the number of encryption transactions may be lower than a second threshold (e.g., 50%), which is smaller than the first threshold. In this example, the encryption transactions may be determined as CPU-bound transactions. As another example, the I/O load of the processing apparatus when processing a number of account transfer transactions may be higher than a first threshold (e.g., 95%), while the CPU load when processing the number of account transfer transactions may be lower than a second threshold (e.g., 40%), which is smaller than the first threshold. In this example, the account transfer transactions may be determined as I/O-bound transactions.

In some embodiments, a particular transaction type can have a same or different bound type with respect to different processing apparatus, depending on the CPU and I/O processing capacity of the processing apparatus. In some embodiments, each of the blockchain transactions can include one or more I/O operations and/or one or more non-I/O operations (e.g., CPU-only operations). In one example, a first processing apparatus (e.g., a first blockchain node) may have a relatively higher CPU processing capacity (e.g., a larger number of CPU-only operations that the CPU can process within a specified time period) than a second processing apparatus (e.g., a second blockchain node), while the I/O processing capacity of the first processing apparatus may be relatively lower than that of the second processing apparatus (e.g., a smaller number of I/O operations that the processing apparatus can process within a specified time period). In this example, the CPU load (e.g., a ratio of the CPU-only operations to be processed by the CPU to the number of CPU-only operations that the CPU can process during the specified time period) of the first processing apparatus may be lower than the CPU load of the second processing apparatus when processing the same blockchain transactions. One the other hand, the I/O load (e.g., a ratio of the I/O operations to be processed by the processing apparatus to the number of I/O operations that the processing apparatus can process during a predetermined time period) of the first processing apparatus may be higher than the I/O load of the second processing apparatus when processing the same blockchain transactions. Further, in this example, the I/O load may be higher than the CPU load in the first processing apparatus, while the CPU load may be higher than the I/O load in the second processing apparatus. As such, the same blockchain transactions may be determined as I/O-bound in the first processing apparatus, but as CPU-bound in the second processing apparatus.

In some embodiments, when processing a task (e.g., executing a number of blockchain transactions received before a new block of a blockchain is generated) including blockchain transactions having more than one transaction types, the processing apparatus can determine the bound type of each one of the blockchain transactions based on its respective transaction type. For example, the processing apparatus may determine that a transaction processing task includes a first number of account transfer transactions, a second number of encryption transactions, and a third number of verification and commit transactions. In this example, the processing apparatus may determine that the account transfer transactions are I/O-bound transactions, the encryption transactions are CPU-bound transactions, and the verification and commit transactions are CPU-bound transactions. In some embodiments, the processing apparatus may determine that the transaction processing task including the transactions of multiple transaction types are I/O-bound if a total number of I/O-bound transactions of the task exceeds a predetermined threshold. In some embodiments, the processing apparatus may determine that the transactions in the transaction processing task are CPU-bound if a total number of CPU-bound transactions in the task exceeds a predetermined threshold. Additional or different criteria can be used in determining a bound type of multiple blockchain transactions that include multiple different transaction types.

In some embodiments, the blockchain transactions can be scheduled for execution by a first number of threads and a second number of coroutines. In some embodiments, the first number of threads can be assigned for parallel processing of the blockchain transactions, and the second number of coroutines can be configured for concurrent processing of the blockchain transactions. In some embodiments, an A×B computing architecture can be used to improve the processing efficiency on two dimensions. Here, A is the number of threads for parallel processing, and B is the number of concurrent I/O operations executable by each thread.

In some embodiment, the number of threads for parallel execution of the blockchain transactions can be determined based on the bound type of the blockchain transactions. If it is determined that a set of blockchain transactions are I/O-bound transactions, a first number of threads (e.g., 1 or 2) may be determined for processing the blockchain transactions. If it is determined that the blockchain transactions are CPU-bound, a second number of threads may be determined for processing the blockchain transactions, where the second number is larger than the first number. For example, the second number can be up to a maximum number of available processor cores (e.g., 256 or 1024) in the processing apparatus. In the example of the afore-mentioned A×B computing architecture, the second number can be up to A.

In some embodiments, the number of coroutines for concurrent execution of the blockchain transactions can be determined based on the bound type of the blockchain transactions. If it is determined that a set of blockchain transactions are I/O-bound transactions, a first number of coroutines may be determined for processing the blockchain transactions. If it is determined that the blockchain transactions are CPU-bound, a second number of coroutines (e.g., 1 or 2) may be determined for processing the blockchain transactions, where the second number is smaller than the first number. For example, the first number of coroutines can be up to a maximum number of concurrent coroutines that can be executed by a thread. In the example of the afore-mentioned A×B computing architecture, the second number can be up to B.

In some embodiments, the number of threads for parallel execution of the blockchain transactions can be determined based on pre-configuration. For example, for both CPU-bound and I/O-bound blockchain transactions, the number of threads for processing the blockchain transactions can be the same and can be pre-configured, for example, based on system configuration or design.

In some embodiments, the number of threads and the number of coroutines can be determined dynamically or in real-time based on system metrics. In some embodiments, the number of threads and the number of coroutines can be determined, for example, based on load analysis of the received blockchain transactions using classification and trained machine learning models.

In one example, the processing apparatus may receive a task of processing a number of 1024 blockchain transactions (e.g., to execute them and store them in a new blockchain block). As an example, the processing apparatus may include a total number of 64 processor cores. The processing apparatus may assign every 16 transactions of the 1024 transactions to each of the 64 processor cores. For the 16 transactions assigned to each processor core, the processing apparatus may configure or create 16 coroutines, respectively, for processing the 16 transactions concurrently.

In another example, the processing apparatus may receive a task of processing a set of blockchain transactions, where each blockchain transaction may include one or more I/O operations and one or more CPU-only operations. In this example, the processing apparatus may include 256 processor cores and the set of blockchain transactions may include 1024 CPU-only operations and 2048 I/O operations. The processing apparatus may configure 256 threads corresponding to the 256 processor cores and assign the 4 CPU-only operations to each of the 256 threads, respectively, for parallel execution. The processing apparatus may further configure 8 coroutines for each of the 256 threads and assign 8 I/O operations to each thread for concurrent execution by the 8 coroutines on the thread.

Blockchain transactions of different transaction types may require different CPU resources and I/O resources. The blockchain transactions may be distributed to the threads of the processing apparatus such that the blockchain transaction assigned to each thread may require substantially the same amount of computing resources. In some embodiments, the processing apparatus may assign the blockchain transactions to the threads based on polling. For example, the processing apparatus may record the thread which a prior transaction is currently assigned to, and select another thread for processing a next transaction. In some embodiments, the processing apparatus may assign the blockchain transactions to the threads based on a random selection method. In one example, the processing apparatus may compute a hash value of a blockchain transaction, compute a module value of the hash value, and select a thread corresponding to the computed modulo value for processing the blockchain transactions. In some embodiments, the processing apparatus may assign the blockchain transactions to the threads based on the amount of transactions that are currently assigned to each thread. For example, the processing apparatus may assign the next transaction to a thread that has the least number of transactions.

In some embodiments, the processing apparatus can execute the blockchain transactions using the number of threads and the number of coroutines determined using the techniques as described herein, and generate a blockchain block that includes the blockchain transactions. In some embodiments, the processing apparatus can add the generated blockchain block to an existing blockchain stored in the storage system. In some embodiments, the processing apparatus can generate a new blockchain, add the blockchain block to the new blockchain, and store the new blockchain in the storage system.

In some embodiments, the processing apparatus can obtain utilization data of computational resources (e.g., CPU, memory, disk, and network) for processing the blockchain transactions. For example, the computational resource utilization data can include real-time or statistical utilization rates (e.g., in terms of percentage) for computational resources consumption for processing the blockchain transactions relative to the overall the computational resource capacity of the processing apparatus and the utilization time of the computational resources. In some embodiments, the processing apparatus can monitor, record, or collect data representing computational resource utilization for processing the blockchain transactions over a duration of time. In one example, the processing apparatus may generate a computational resource utilization record or report to include a summary of the computational resource utilization data.

In some embodiments, the processing apparatus may further analyze the utilization data. In one example, the processing apparatus may determine whether the blockchain transactions that have been executed are indeed I/O-bound or CPU-bound with respect to the consumed computational resources of the processing apparatus based on the utilization data. In the example, the processing apparatus may determine whether a blockchain transaction of a particular transaction type is CPU-bound or I/O-bound with respect to the consumed computational resources of the processing apparatus based on the utilization data. The processing apparatus may further determine a threshold in classifying the blockchain transactions as CPU-bound or I/O-bound with respect to the consumed computational resources of the processing apparatus based on the utilization data.

In some embodiments, the processing apparatus can analyze the utilization data of the processing apparatus for processing different batches blockchain transactions over a time period (e.g., duration of the generation of one or more blockchain blocks, a few minutes, hours, days, weeks, etc.).

In some embodiments, the processing apparatus can update a criterion for determining whether a next batch of blockchain transactions are CPU-bound or I/O-bound based on the analysis of the utilization data. In one example, the processing apparatus may designate a new type of blockchain transaction as CPU-bound or I/O-bound. The processing apparatus may change a classification of an existing type of blockchain transactions from CPU-bound to I/O-bound, or vice versa. The processing apparatus may update a threshold/thresholds for determining whether the next batch of blockchain transactions are CPU-bound or I/O-bound.

The techniques as described herein can improve computer technologies by making more effective use of computational resources of a computer system for processing blockchain transactions, for example, based on a bound type of the blockchain transactions. Compared with existing transaction processing schemes, the disclosed scheme can customize or otherwise configure a computer system's computational resources (e.g., the number of processing cores and threads) based on the received blockchain transactions to better allocate and assign the computational resources (e.g., in terms of threads and coroutines) to process the blockchain transactions. The disclosed scheme can exploit the disk U/O processing ability (e.g., as measured by input/output operations per second (IOPS)) and CPU power of a blockchain system (e.g., as measured by transactions per second (TPS) or a block generation time/speed of the blockchain system), without requiring an addition or upgrade of the hardware computational resources. In one example, if a blockchain system receives multiple asset transfer transactions that include a large number of I/O operations and thus require more I/O resources than CPU resources, the blockchain system can determine that the asset transfer transactions are I/O-bound and thus configure more coroutines to process the asset transfer transactions to mitigate an I/O bottleneck of the blockchain system. As a result, the time for executing the asset transfer transactions can be reduced, the TPS and processing efficiency of the blockchain system can be improved. Moreover, a block generation time (e.g., the time for generating a new blockchain block that stores the executed asset transfer transactions) can be shortened, thus improving a processing capacity or throughput of the blockchain system. In another example, if the blockchain system receive multiple encryption transactions that include a large number of logic computations and thus require more CPU resources than I/O resources, the blockchain system may configure more threads to mitigate a CPU bottleneck of the processing apparatus. As a result, the time for executing the encryption transactions can be reduced, the TPS and processing efficiency of the blockchain system can be improved. Moreover, a block generation time (e.g., the time for generating a new blockchain block that stores the executed encryption transactions) can be shortened, thus improving the processing capacity or throughput of the blockchain system.

In some embodiments, the techniques as described herein can configure a separate thread pool associated with the blockchain storage system to handle I/O operations in the blockchain transactions when the I/O operations have been executed to where they need to access the storage system. In some embodiments, the separate thread pool is dedicated to I/O operations that interface with I/O devices in the blockchain storage system and read/write blockchain data in the blockchain storage system. In one example, the processing apparatus may have 64 processor cores. In this example, the processing apparatus may reserve 16 of the 64 processor cores for the storage system so that 16 coroutines of I/O access can be performed in parallel using the reserved 16 processor cores. The remaining 48 processor cores may be used for processing blockchain transactions in parallel, achieving a 48*16× efficiency improvement compared to serial processing of the blockchain transactions.

Figure 8:
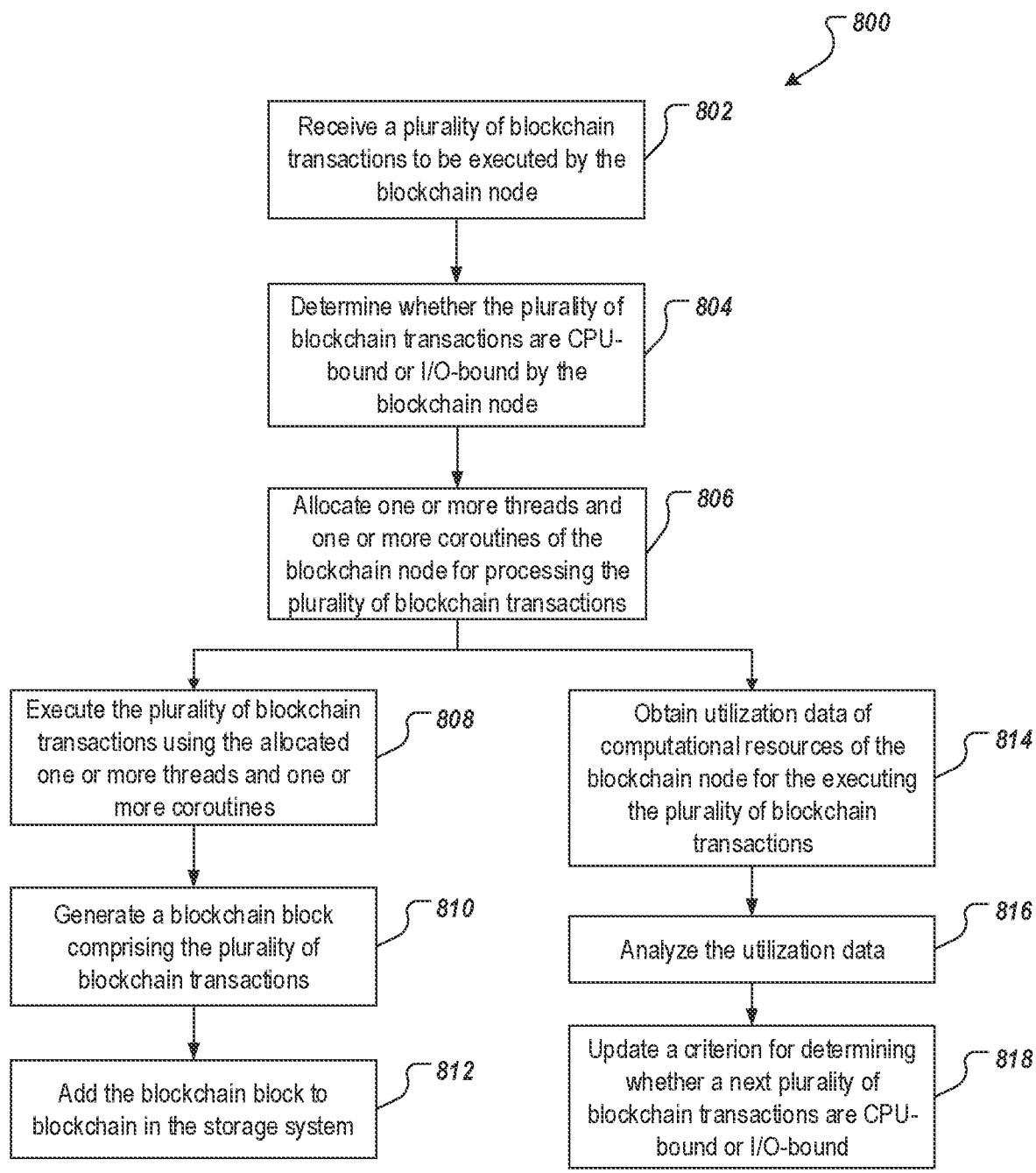
FIG. 8 is a flowchart illustrating an example of a process of processing blockchain transactions that can be executed in accordance with embodiments of this specification.

FIG. 8 is a flowchart illustrating an example of a process 800 that can be executed in accordance with embodiments of this specification. The flowchart represents a process 800 for processing blockchain transactions. For convenience, the process will be described as being performed by a system of one or more computers, located in one or more locations, and programmed appropriately in accordance with this specification. For example, a blockchain-based system (e.g., the blockchain system 300 of FIG. 3), appropriately programmed, can perform the process. In some embodiments, a blockchain network node (e.g., blockchain network node 214 of FIG. 2), appropriately programmed, can perform the process.

At step 802, a blockchain node (e.g., blockchain network node 214 of FIG. 2) of a blockchain network receives a plurality of blockchain transactions to be executed by the blockchain node. In some embodiments, the blockchain node includes or is otherwise associated with a storage system (e.g., storage kernel 308 of FIG. 3 or storage system 400 of FIG. 4) that stores blockchain data in a blockchain. In one example, a blockchain transaction can include one or more operations to perform one or more tasks or functions, such as verifying the blockchain transaction, committing the blockchain transaction in response to a successful verification of the blockchain transaction, writing data or other information of the blockchain transaction into the database, declaring prologue and epilogue of functions, compiling or other operations/function in the blockchain transaction. In some embodiments, the blockchain transaction can have a transaction type and a bound type (e.g., CPU-bound or I/O-bound) as described above.

At step 804, the blockchain node determines whether the plurality of blockchain transactions are CPU-bound or I/O-bound. In some embodiments, a CPU-bound blockchain transaction can generally refer to a blockchain transaction that is bottlenecked by the CPU. A CPU-bound blockchain transaction can mainly include CPU-bound operations such that a time to complete the CPU-bound blockchain transaction is determined principally by the speed of the central processor. An I/O-bound blockchain transaction refers to a blockchain transaction that is bottlenecked by U/O. An I/O-bound blockchain transaction can include one or more I/O operations (e.g., reading or writing to disk, network, etc.) such that a time to complete the I/O-bound blockchain transaction is determined principally by the period spent waiting for I/O operations to be completed.

In some embodiments, the blockchain node can determine the plurality of blockchain transactions are CPU-bound or I/O-bound based on a transaction type of at least one of the plurality of blockchain transactions.

In some embodiments, the transaction type can include an asset transfer transaction, an account inquiry transaction, a verification and commit transaction, a certificate storage transaction, a native smart contract transaction, an encryption transaction, a TEE (Trusted Execution Environment) transaction, a WASM (WebAssembly) transaction, an EVM (Ethereum Virtual Machine) transaction, or another type of transaction.

In some embodiments, the blockchain node can determine whether the at least one of the plurality of blockchain transactions is CPU-bound or I/O-bound based on a statistical computational resource utilization record of previous blockchain transactions of the same transaction type. In one example, a training process can be performed on the blockchain transactions to learn how to determine whether a blockchain transaction is CPU-bound or I/O-bound based on sample data or training data, for example, according to the techniques described above. In some embodiments, the statistical computational resource utilization record can be specific to the blockchain node (i.e., a statistical computational resource utilization record of previous blockchain transactions of the transaction type executed by the blockchain node. In some embodiments, the statistical computational resource utilization record can be used as the training data and include historical transaction data of the blockchain node and metrics data of the blockchain node. In some embodiments, the statistical computational resource utilization record can include one or more computational resource utilization records of other computer systems having similar specifications to the blockchain node.

In some embodiments, the statistical computational resource utilization data can further include data about the CPU load and I/O load of the system during a specific time period. For example, the statistical computational resource utilization data can include statistical utilization rates (e.g., in terms of percentage) for computational resources consumption for processing the blockchain transactions relative to the overall computational resource capacity of the processing apparatus and the utilization time of the computational resources. In some embodiments, the CPU load can be determined based on a ratio of the number of the tasks/operations to be processed by the CPU to the number of tasks/operations that the CPU can process during a specific period. The I/O load can be determined based on a ratio of the I/O tasks/operations to be processed by the system to the number of the I/O tasks/operations that the system can process during a specific period.

In some embodiments, the bound type (e.g., CPU-bound or I/O-bound) of a blockchain transaction having a particular transaction type can be determined based on the CPU load and I/O load of processing previous blockchain transactions having the same transaction type. In on example, if the CPU load is equal to or higher than a first predetermined threshold, and/or the I/O load is equal to or lower than a second predetermined threshold, the blockchain transactions having the particular transaction type can be determined as CPU-bound.

In some embodiments, the blockchain transactions to be executed by the blockchain node can include blockchain transactions having multiple transaction types. For example, the blockchain node may determine that a transaction processing task includes a first number of account transfer transactions, a second number of encryption transactions, and a third number of verification and commit transactions. In this example, the system may further determine that the account transfer transactions are I/O-bound transactions, the encryption transactions are CPU-bound transactions, and the verification and commit transactions are CPU-bound transactions.

In some embodiments, the blockchain node can determine that the plurality of blockchain transactions are I/O-bound in response to determining that a total number of I/O-bound transactions in the plurality of blockchain transactions exceeds a first threshold.

In some embodiments, the blockchain node can determine that the plurality of blockchain transactions are CPU-bound in response to determining that a total number of CPU-bound transactions in the plurality of blockchain transactions exceeds a second threshold.

At step 806, the blockchain nodes allocates one or more threads of the blockchain node and one or more coroutines of the blockchain node for processing the plurality of blockchain transactions based on whether the plurality of blockchain transactions are CPU-bound or I/O-bound.

In some embodiment, the number of threads for processing the blockchain transactions can be determined based on the bound type of the blockchain transactions. In some embodiments, the blockchain node determines a first number of threads for processing the plurality of blockchain transactions in parallel in response to determining that the plurality of blockchain transactions are I/O-bound. In some embodiments, the blockchain node determines a second number of threads for processing the plurality of blockchain transactions in parallel in response to determining that the plurality of blockchain transactions are CPU-bound. In some embodiments, the first number of threads are equal to or less than the second number of threads. In some embodiments, the first number of threads can be preconfigured before receiving the plurality of blockchain transactions.

In one example, if it is determined that a set of blockchain transactions are I/O-bound transactions, a small number of threads (e.g., 1 or 2) may be determined for processing the blockchain transactions. If it is determined that the blockchain transactions are CPU-bound, a relatively larger number of threads, which can be a maximum number of available processor cores (e.g., 256 or 1024), may be determined for processing the blockchain transactions in parallel.

In some embodiments, the blockchain node comprises a total number of threads, a subset of the total number of threads is dedicated to the storage system, and wherein the first number of threads are not from the subset of the total number of threads. For example, if the total number of threads of the blockchain node is 256, and 16 of the 256 threads are dedicated to the storage system, the maximum number of available threads can be allocated for processing the blockchain transactions in parallel is 256−16=240. In this example, for each processing thread, up to 16 coroutines can be executed simultaneously for I/O operations using the 16 threads dedicated to the storage system.

In some embodiments, the number of coroutines for processing the blockchain transactions can be determined based on the bound type of the blockchain transactions. In some embodiments, the blockchain node can determine a third number of coroutines for processing the plurality of blockchain transactions asynchronously in response to determining that the plurality of blockchain transactions are I/O-bound. In some embodiments, the blockchain node can determine a fourth number of coroutines for processing the plurality of blockchain transactions asynchronously in response to determining that the plurality of blockchain transactions are CPU-bound. In some embodiments, the fourth number of coroutines are less than the third number of coroutines.

In one example, if it is determined that a set of blockchain transactions are I/O-bound transactions, a large number of coroutines, which can be a maximum number of concurrent coroutines that can be executed by a thread, may be determined for processing the blockchain transactions. If it is determined that the blockchain transactions are CPU-bound, a small number of coroutines (e.g., 1 or 2) may be determined for processing the blockchain transactions.

In some embodiments, the first number of threads configured for processing the blockchain transaction can remain the same for different batches of received transactions. In some embodiments, the second number of coroutines can be updated or dynamically determined every time a new batch of transactions are received. In some embodiments, the first number of threads can be updated or changed less frequently than the second number of coroutines.

At step 808, the blockchain node executes the plurality of blockchain transactions using the allocated one or more threads and one or more coroutines. The plurality of blockchain transactions can be distributed to the allocated one or more threads based on a certain scheduling algorithm (e.g., Round Robin, random selection) or another criterion as described above.

At step 810, the blockchain node generates a blockchain block including the plurality of blockchain transactions after executing the plurality of blockchain transactions. In some embodiments, the blockchain block can include blockchain transactions of the same transaction type or different transaction types. In some embodiments, the blockchain node can generate more than one blockchain block to include the transactions having different transaction types, where each blockchain block includes the transactions having the same transaction type.

At step 812, the blockchain node adds the blockchain block to the blockchain in the storage system associated with the blockchain node. In some embodiments, the blockchain node can add the blockchain block to a blockchain so that the executed plurality of blockchain transactions can be uploaded or published to the blockchain network.

At step 814, the blockchain node obtains utilization data of computational resources of the blockchain node for executing the plurality of blockchain transactions. In some embodiments, the blockchain node can monitor, record, or collect data representing computational resource utilization of the blockchain node when executing the blockchain transactions. In some embodiments, the utilization data can include data of computational resource utilization when the blockchain node executes the blockchain transactions, for example, as described above. In one example, the blockchain node may generate a computational resource utilization record or report to include a summary of the computational resource utilization data.

At step 816, the blockchain node analyzes the utilization data. In some embodiments, the blockchain node can determine whether the plurality of blockchain transactions are indeed I/O-bound or CPU-bound with respect to the computational resources of the blockchain node based on the utilization data. In some embodiments, the blockchain node can determine whether a type of blockchain transaction is I/O-bound or CPU-bound with respect to the computational resources of the blockchain node based on the utilization data. In some embodiments, the blockchain node can determine a threshold in classifying the plurality of blockchain transactions as I/O-bound or CPU-bound with respect to the computational resources of the blockchain node based on the utilization data. The blockchain node can perform additional or different analysis of the utilization data.

In some embodiments, the blockchain node can analyze the utilization data of the blockchain node for executing different batches of transactions over a period of time (e.g., a duration of a generation of multiple blockchain blocks, a few minutes, hours, days, weeks, etc.). The accumulated utilization data can be analyzed to further improve the classification accuracy of the bound type of blockchain transactions, and can be used to better tailor or customize the allocation of threads and coroutines for processing the blockchain transactions.

At step 818, the blockchain node updates a criterion for determining whether a next plurality of blockchain transactions are CPU-bound or I/O-bound based on the analysis. In some embodiments, updating a criterion can include designating a new type of blockchain transaction as CPU-bound or I/O-bound, changing a classification of an existing type of blockchain transactions from CPU-bound to I/O-bound or from I/O-bound to CPU-bound, updating a threshold of determining the next plurality of blockchain transactions are CPU-bound or I/O-bound, or making other changes. For example, the blockchain node can determine that the next plurality of transactions are I/O-bound when determining that a total number of the I/O-bound transactions in the plurality of blockchain transactions exceeds an update threshold that is different from the threshold that is used for determining whether the last batch of transactions are I/O-bound. As another example, the blockchain node can determine that the next plurality of transactions are CPU-bound when determining that a total number of the CPU-bound transactions in the plurality of blockchain transactions exceeds an update threshold that is different from the threshold that is used for determining whether the last batch of transactions are CPU-bound.

Figure 9:
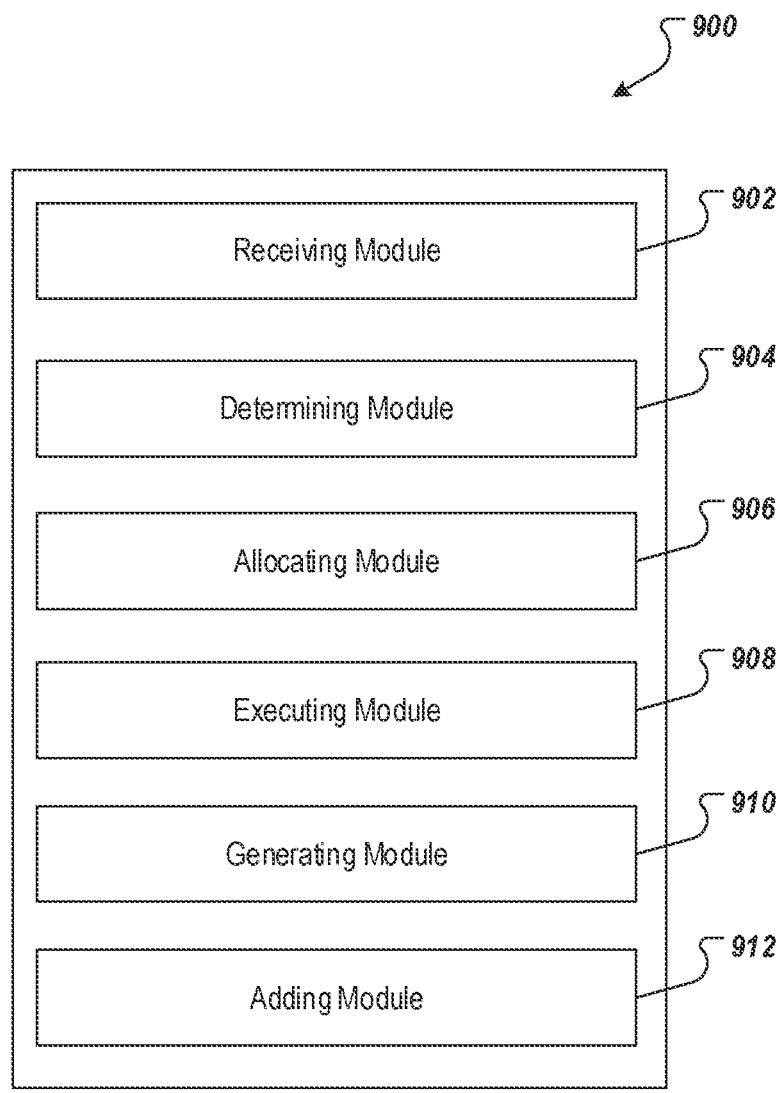
FIG. 9 is a diagram illustrating an example of modules of an apparatus in accordance with embodiments of this specification.

FIG. 9 is a diagram of an example of modules of an apparatus 900 in accordance with embodiments of this specification. The apparatus 900 can be an example of an embodiment of a blockchain node configured to process blockchain transactions. The apparatus 900 can correspond to the embodiments described above, and the apparatus 900 includes the following: a receiving module 902 that receives a plurality of blockchain transactions to be executed by a blockchain node, wherein the blockchain node is associated with a storage system that stores blockchain data in a blockchain; a determining module 904 that determines whether the plurality of blockchain transactions are CPU-bound or I/O-bound; an allocating module 906 that allocates one or more threads of the blockchain node and one or more coroutines of the blockchain node for processing the plurality of blockchain transactions based on whether the plurality of blockchain transaction are CPU-bound or I/O-bound; an executing module 908 that executes the plurality of blockchain transactions using the allocated one or more threads and one or more coroutines; a generating module 910 that generates a blockchain block comprising the plurality of blockchain transactions after executing the plurality of blockchain transactions; and an adding module 912 that adds the blockchain block to the blockchain in the storage system associated with the blockchain node.

In some embodiments, the apparatus 900 further includes: a first determining submodule that determines a first number of threads for processing the plurality of blockchain transactions in parallel in response to determining that the plurality of blockchain transactions are I/O-bound; a second determining submodule that determines a second number of threads for processing the plurality of blockchain transaction in parallel in response to determining that the plurality of blockchain transactions are CPU-bound. The first number of threads are equal to or less than the second number of threads, and the first number of threads is preconfigured before receiving the plurality of blockchain transactions.

In some embodiments, the apparatus 900 further includes: a third determining submodule that determines a third number of coroutines for processing the plurality of blockchain transactions asynchronously in response to determining that the plurality of blockchain transactions are I/O-bound; a fourth determining submodule that determines a fourth number of coroutines for processing the plurality of blockchain transactions asynchronously in response to determining that the plurality of blockchain transactions are CPU-bound. The fourth number of coroutines are less than the third number of coroutines.

In some embodiments, the apparatus 900 further includes: a fifth determining submodule that determines the plurality of blockchain transactions are CPU-bound or I/O-bound based on a transaction type of at least one of the plurality of blockchain transactions.

In some embodiments, the transaction type comprises an asset transfer transaction, an account inquiry transaction, a verification and commit transaction, a certificate storage transaction, a native smart contract transaction, an encryption transaction, a TEE (Trusted Execution Environment) transaction, a WASM (WebAssembly) transaction, or an EVM (Ethereum Virtual Machine) transaction.

In some embodiments, the apparatus 900 further includes: a sixth determining submodule that determines whether the at least one of the plurality of blockchain transactions is CPU-bound or I/O-bound based on a statistical computational resource utilization record of previous blockchain transactions of the transaction type.

In some embodiments, the apparatus 900 further includes: a seventh determining submodule that determines the plurality of blockchain transactions are I/O-bound in response to determining that a total number of I/O-bound transactions in the plurality of blockchain transactions exceeds a first threshold.

In some embodiments, the apparatus 900 further includes: an eighth determining submodule that determines the plurality of blockchain transactions are CPU-bound in response to determining that a total number of CPU-bound transactions in the plurality of blockchain transactions exceeds a second threshold.

In some embodiments, the blockchain node includes a total number of threads, a subset of the total number of threads is dedicated to the storage system, and the first number of threads are not from the subset of the total number of threads.

In some embodiments, the apparatus 900 further includes: an obtaining module that obtains utilization data of computational resources of the blockchain node for the executing the plurality of blockchain transactions; an analyzing module that analyzes the utilization data; and an updating module that updates a criterion for determining whether a next plurality of blockchain transactions are CPU-bound or I/O-bound based on the analyzing.

In some embodiments, the apparatus 900 further includes: a designating submodule that designates a new type of blockchain transaction as CPU-bound or I/O-bound; a changing submodule that changes a classification of an existing type of blockchain transactions from CPU-bound to I/O-bound or from I/O-bound to CPU-bound; and an updating submodule that updates a threshold of determining the next plurality of blockchain transactions are CPU-bound or I/O-bound.

The system, apparatus, module, or unit illustrated in the previous embodiments can be implemented by using a computer chip or an entity or can be implemented by using a product having a certain function. A typical embodiment device is a computer (and the computer can be a personal computer), a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 9, it can be interpreted as illustrating an internal functional module and a structure of a blockchain transaction processing apparatus. The blockchain transaction processing apparatus can be an example of a computer server associated with a blockchain network node. An execution body, in essence, can be an electronic device, and the electronic device includes the following: one or more processors; and one or more computer-readable memories configured to store an executable instruction of the one or more processors. In some embodiments, the one or more computer-readable memories are coupled to the one or more processors and have programming instructions stored thereon that are executable by the one or more processors to perform algorithms, methods, functions, processes, flows, and procedures as described in this specification. This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, subprograms, or portions of code.

Processors for the execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., an LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of messages to a personal device, e.g., a smartphone that is running a messaging application and receiving responsive messages from the user in return.

This specification uses the term "configured to" in connection with systems, apparatus, and computer program components. For a system of one or more computers to be configured to perform particular operations or actions means that the system has installed on its software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiment can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for processing blockchain transactions, the method comprising: receiving, by a blockchain node of a blockchain network, a plurality of blockchain transactions to be executed by the blockchain node, wherein the blockchain node is associated with a storage system that stores blockchain data in a blockchain;
   determining, by the blockchain node, whether the plurality of blockchain transactions are CPU-bound or I/O-bound based on a CPU load and an I/O load for processing previous blockchain transactions having a same transaction type as one of the plurality of blockchain transactions, wherein determining whether the plurality of blockchain transactions are CPU-bound or I/O-bound based on a CPU load and an I/O load comprises:
      in response to determining that the CPU load is equal to or higher than a first threshold, and that the I/O load is equal to or lower than a second threshold, determining the plurality of blockchain transactions are CPU-bound; or
      in response to determining that the CPU load is lower than the first threshold, and that the I/O load is higher than the second threshold, determining the plurality of blockchain transactions are I/O-bound;
   allocating, by the blockchain node based on whether the plurality of blockchain transactions are CPU-bound or I/O-bound and as allocated one or more threads, one or more threads of the blockchain node and one or more coroutines of the blockchain node for processing the plurality of blockchain transactions;
   executing, by the blockchain node using the allocated one or more threads and one or more coroutines, the plurality of blockchain transactions;
   after executing the plurality of blockchain transactions, generating, by the blockchain node, a blockchain block comprising the plurality of blockchain transactions; and
   adding, by the blockchain node and in the storage system, the blockchain block to the blockchain.

2. The computer-implemented method of claim 1, wherein allocating, based on whether the plurality of blockchain transactions are CPU-bound or I/O-bound, one or more threads of the blockchain node and one or more co-routines of the blockchain node for processing the plurality of blockchain transactions comprises:
   in response to determining that the plurality of blockchain transactions are I/O-bound, determining a first number of threads for processing the plurality of blockchain transactions in parallel; or
   in response to determining that the plurality of blockchain transactions are CPU-bound, determining a second number of threads for processing the plurality of blockchain transactions in parallel, wherein the first number of threads are equal to or less than the second number of threads, and wherein the first number of threads is preconfigured before receiving the plurality of blockchain transactions.

3. The computer-implemented method of claim 1, wherein allocating, based on whether the plurality of blockchain transactions are CPU-bound or I/O-bound, one or more threads of the blockchain node and one or more coroutines of the blockchain node for processing the plurality of blockchain transactions comprises:
   in response to determining that the plurality of blockchain transactions are I/O-bound, determining a third number of coroutines for processing the plurality of blockchain transactions asynchronously; or
   in response to determining that the plurality of blockchain transactions are CPU-bound, determining a fourth number of coroutines for processing the plurality of blockchain transactions asynchronously, wherein the fourth number of coroutines are less than the third number of coroutines.

4. The computer-implemented method of claim 1, wherein determining whether the plurality of blockchain transactions are CPU-bound or I/O-bound is based on a transaction type of at least one of the plurality of blockchain transactions.

5. The computer-implemented method of claim 4, wherein the transaction type comprises an asset transfer transaction, an account inquiry transaction, a verification and commit transaction, a certificate storage transaction, a native smart contract transaction, an encryption transaction, a TEE (Trusted Execution Environment) transaction, a WASM (WebAssembly) transaction, or an EVM (Ethereum Virtual Machine) transaction.

6. The computer-implemented method of claim 4, wherein the determining comprises:
  determining, based on a statistical computational resource utilization record of previous blockchain transactions of the transaction type, whether the at least one of the plurality of blockchain transactions is CPU-bound or I/O-bound.

7. The computer-implemented method of claim 6, wherein the determining comprises:
  determining, by the blockchain node and in response to determining that a total number of I/O-bound transactions in the plurality of blockchain transactions exceeds a first threshold, that the plurality of blockchain transactions are I/O-bound.

8. The computer-implemented method of claim 6, wherein the determining comprises:
  determining, by the blockchain node and in response to determining that a total number of CPU-bound transactions in the plurality of blockchain transactions exceeds a second threshold, that the plurality of blockchain transactions are CPU-bound.

9. The computer-implemented method of claim 2, wherein the blockchain node comprises a total number of threads, wherein a subset of the total number of threads is dedicated to the storage system, and wherein the first number of threads are not from the subset of the total number of threads.

10. The computer-implemented method of claim 1, further comprising:
  obtaining utilization data, wherein the utilization data is of computational resources of the blockchain node for execution of the plurality of blockchain transactions;
  analyzing the utilization data; and
  updating a criterion for determining whether a next plurality of blockchain transactions are CPU-bound or I/O-bound based on the analyzing.

11. A non-transitory computer-readable medium storing one or more instructions executable by a computer system to perform operations for processing blockchain transactions, comprising:
  receiving, by a blockchain node of a blockchain network, a plurality of blockchain transactions to be executed by the blockchain node, wherein the blockchain node is associated with a storage system that stores blockchain data in a blockchain;
  determining, by the blockchain node, whether the plurality of blockchain transactions are CPU-bound or I/O-bound based on a CPU load and an I/O load for processing previous blockchain transactions having a same transaction type as one of the plurality of blockchain transactions, wherein determining whether the plurality of blockchain transactions are CPU-bound or I/O-bound based on a CPU load and an I/O load comprises:
    in response to determining that the CPU load is equal to or higher than a first threshold, and that the I/O load is equal to or lower than a second threshold, determining the plurality of blockchain transactions are CPU-bound; or
    in response to determining that the CPU load is lower than the first threshold, and that the I/O load is higher than the second threshold, determining the plurality of blockchain transactions are I/O-bound;
  allocating, by the blockchain node based on whether the plurality of blockchain transactions are CPU-bound or I/O-bound and as allocated one or more threads, one or more threads of the blockchain node and one or more coroutines of the blockchain node for processing the plurality of blockchain transactions;
  executing, by the blockchain node using the allocated one or more threads and one or more coroutines, the plurality of blockchain transactions;
  after executing the plurality of blockchain transactions, generating, by the blockchain node, a blockchain block comprising the plurality of blockchain transactions; and
  adding, by the blockchain node and in the storage system, the blockchain block to the blockchain.

12. The non-transitory computer-readable medium of claim 11, wherein allocating, based on whether the plurality of blockchain transactions are CPU-bound or I/O-bound, one or more threads of the blockchain node and one or more co-routines of the blockchain node for processing the plurality of blockchain transactions comprises:
  in response to determining that the plurality of blockchain transactions are I/O-bound, determining a first number of threads for processing the plurality of blockchain transactions in parallel; or
  in response to determining that the plurality of blockchain transactions are CPU-bound, determining a second number of threads for processing the plurality of blockchain transactions in parallel, wherein the first number of threads are equal to or less than the second number of threads, and wherein the first number of threads is preconfigured before receiving the plurality of blockchain transactions.

13. The non-transitory computer-readable medium of claim 11, wherein allocating, based on whether the plurality of blockchain transactions are CPU-bound or 1/0-bound, one or more threads of the blockchain node and one or more coroutines of the blockchain node for processing the plurality of blockchain transactions comprises:
  in response to determining that the plurality of blockchain transactions are I/O-bound, determining a third number of coroutines for processing the plurality of blockchain transactions asynchronously; or
  in response to determining that the plurality of blockchain transactions are CPU-bound, determining a fourth number of coroutines for processing the plurality of blockchain transactions asynchronously, wherein the fourth number of coroutines are less than the third number of coroutines.

14. The non-transitory computer-readable medium of claim 11, wherein determining whether the plurality of blockchain transactions are CPU-bound or I/O-bound is based on a transaction type of at least one of the plurality of blockchain transactions.

15. The non-transitory computer-readable medium of claim 14, wherein the transaction type comprises an asset transfer transaction, an account inquiry transaction, a verification and commit transaction, a certificate storage transaction, a native smart contract transaction, an encryption transaction, a TEE (Trusted Execution Environment) transaction, a WASM (WebAssembly) transaction, or an EVM (Ethereum Virtual Machine) transaction.

16. The non-transitory computer-readable medium of claim 14, wherein the determining comprises:
  determining, based on a statistical computational resource utilization record of previous blockchain transactions of the transaction type, whether the at least one of the plurality of blockchain transactions is CPU-bound or I/O-bound.

17. The non-transitory computer-readable medium of claim 16, wherein the determining comprises:

determining, by the blockchain node and in response to determining that a total number of I/O-bound transactions in the plurality of blockchain transactions exceeds a first threshold, that the plurality of blockchain transactions are I/O-bound.

18. The non-transitory computer-readable medium of claim 16, wherein the determining comprises:
determining, by the blockchain node and in response to determining that a total number of CPU-bound transactions in the plurality of blockchain transactions exceeds a second threshold, that the plurality of blockchain transactions are CPU-bound.

19. The non-transitory computer-readable medium of claim 12, wherein the blockchain node comprises a total number of threads, wherein a subset of the total number of threads is dedicated to the storage system, and wherein the first number of threads are not from the subset of the total number of threads.

20. The non-transitory computer-readable medium of claim 11, further comprising operations for:
obtaining utilization data, wherein the utilization data is of computational resources of the blockchain node for execution of the plurality of blockchain transactions;
analyzing the utilization data; and
updating a criterion for determining whether a next plurality of blockchain transactions are CPU-bound or I/O-bound based on the analyzing.

21. A computer-implemented system for processing blockchain transactions, comprising:
one or more computers; and
one or more computer memory devices interoperably coupled with the one or more computers and having tangible, non-transitory, machine-readable media storing one or more instructions that, when executed by the one or more computers, cause the one or more computers to perform one or more operations comprising:
receiving, by a blockchain node of a blockchain network, a plurality of blockchain transactions to be executed by the blockchain node, wherein the blockchain node is associated with a storage system that stores blockchain data in a blockchain;
determining, by the blockchain node, whether the plurality of blockchain transactions are CPU-bound or I/O-bound based on a CPU load and an I/O load for processing previous blockchain transactions having a same transaction type as one of the plurality of blockchain transactions, wherein determining whether the plurality of blockchain transactions are CPU-bound or I/O-bound based on a CPU load and an I/O load comprises:
in response to determining that the CPU load is equal to or higher than a first threshold, and that the I/O load is equal to or lower than a second threshold, determining the plurality of blockchain transactions are CPU-bound; or
in response to determining that the CPU load is lower than the first threshold, and that the I/O load is higher than the second threshold, determining the plurality of blockchain transactions are I/O-bound;
allocating, by the blockchain node based on whether the plurality of blockchain transactions are CPU-bound or I/O-bound and as allocated one or more threads, one or more threads of the blockchain node and one or more coroutines of the blockchain node for processing the plurality of blockchain transactions;
executing, by the blockchain node using the allocated one or more threads and one or more coroutines, the plurality of blockchain transactions;
after executing the plurality of blockchain transactions, generating, by the blockchain node, a blockchain block comprising the plurality of blockchain transactions; and
adding, by the blockchain node and in the storage system, the blockchain block to the blockchain.

* * * * *

UNITED STATES PATENT AND TRADEMARK OFFICE
CERTIFICATE OF CORRECTION

PATENT NO. : 11,487,736 B2
APPLICATION NO. : 17/353399
DATED : November 1, 2022
INVENTOR(S) : Shikun Tian It is certified that error appears in the above-identified patent and that said Letters Patent is hereby corrected as shown below:

In the Claims

Column 42, Line 32, in Claim 13, delete "1/0-bound," and insert -- I/O-bound, --.

Signed and Sealed this
Seventh Day of March, 2023

Katherine Kelly Vidal
*Director of the United States Patent and Trademark Office*